United States Patent
Kuroki et al.

(10) Patent No.: US 9,447,752 B2
(45) Date of Patent: Sep. 20, 2016

(54) DETECTION METHOD OF AIRTIGHT FAILURE IN WORKING-GAS CIRCULATING TYPE GAS ENGINE, AND WORKING-GAS CIRCULATING TYPE GAS ENGINE USING THE METHOD

(75) Inventors: Rentaro Kuroki, Susono (JP); Daisaku Sawada, Gotenba (JP); Akira Kato, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 247 days.

(21) Appl. No.: 14/128,737

(22) PCT Filed: Jul. 11, 2011

(86) PCT No.: PCT/JP2011/065796
§ 371 (c)(1),
(2), (4) Date: Dec. 23, 2013

(87) PCT Pub. No.: WO2013/008294
PCT Pub. Date: Jan. 17, 2013

(65) Prior Publication Data
US 2014/0130777 A1 May 15, 2014

(51) Int. Cl.
*F02M 25/00* (2006.01)
*F02D 41/22* (2006.01)
(Continued)

(52) U.S. Cl.
CPC ............ *F02M 25/00* (2013.01); *F02D 19/025* (2013.01); *F02D 19/027* (2013.01);
(Continued)

(58) Field of Classification Search
CPC .. F02D 19/025; F02D 19/026; F02D 19/027; F02D 19/028; F02D 19/029; F02D 21/02; F02D 21/04; F02D 21/06; F02D 21/08; F02M 21/0206; F02M 25/00; F02M 25/0702
USPC .................. 123/518, 519, 520, 568.16, 529; 73/114.42, 114.48, 114.74
See application file for complete search history.

(56) References Cited

U.S. PATENT DOCUMENTS

| | | | | |
|---|---|---|---|---|
| 5,635,633 A | * | 6/1997 | Kadota | F02D 41/22 123/520 |
| 6,904,792 B2 | * | 6/2005 | Wakahara | F01N 3/225 73/114.38 |

(Continued)

FOREIGN PATENT DOCUMENTS

| | | |
|---|---|---|
| JP | 10-159634 A | 6/1998 |
| JP | 11-336620 A | 12/1999 |

(Continued)

OTHER PUBLICATIONS

International Search Report of PCT/JP2011/065796 dated Aug. 2, 2011.

*Primary Examiner* — Stephen K Cronin
*Assistant Examiner* — Kevin R Steckbauer
(74) *Attorney, Agent, or Firm* — Sughrue Mion, PLLC

(57) ABSTRACT

[Subject] A low-cost and brief method to detect an airtight failure in a working-gas circulating type gas engine with sufficient accuracy and a working-gas circulating type gas engine using the method should be provided.
[Means for Solution] In a working-gas circulating type gas engine, an extra predetermined quantity 1 of at least one of fuel gas, oxidizer gas, and working gas is supplied as surplus gas into a circulation passage. Based on the difference between this predetermined quantity 1 and increment of this predetermined quantity 1 and the increment of the quantity of the gas in the circulation passage separately detected by a gas quantity detecting means, the existence of an airtight failure in the engine is judged.

10 Claims, 6 Drawing Sheets

(51) Int. Cl.
*F02M 21/02* (2006.01)
*F02D 19/02* (2006.01)
*F02D 21/04* (2006.01)
*F02D 41/00* (2006.01)
*F01N 3/00* (2006.01)

(52) U.S. Cl.
CPC ........... *F02D 19/029* (2013.01); *F02D 21/04* (2013.01); *F02D 41/22* (2013.01); *F02D 41/221* (2013.01); *F02M 21/0206* (2013.01); *F02M 26/36* (2016.02); *F01N 3/005* (2013.01); *F01N 2240/02* (2013.01); *F02D 41/0027* (2013.01); *F02M 21/0275* (2013.01); *Y02T 10/32* (2013.01); *Y02T 10/40* (2013.01)

(56) References Cited

U.S. PATENT DOCUMENTS

| | | | | |
|---|---|---|---|---|
| 7,661,416 B2* | 2/2010 | Sasajima | ................. | F02B 43/10 123/25 A |
| 7,771,854 B2* | 8/2010 | Kotani | .............. | H01M 8/04231 429/428 |
| 7,829,233 B2* | 11/2010 | Kizaki | .............. | H01M 8/04089 429/443 |
| 8,065,991 B2* | 11/2011 | Kuroki | .................. | F01M 13/00 123/1 A |
| 8,151,779 B1* | 4/2012 | Hagiwara | ............... | F02B 43/10 123/575 |
| 8,283,083 B2* | 10/2012 | Kamihara | ......... | H01M 8/04231 429/428 |
| 8,322,128 B2* | 12/2012 | Mitani | .................... | F02B 43/10 60/278 |
| 8,387,441 B2* | 3/2013 | Falta | ......................... | G01F 1/34 73/114.38 |
| 8,453,623 B2* | 6/2013 | Kuroki | .................... | F02B 43/10 123/527 |
| 8,662,057 B2* | 3/2014 | Kuroki | .................... | F02D 21/08 123/568.11 |
| 8,869,528 B2* | 10/2014 | Ryu | .................. | F02M 25/0709 123/568.16 |
| 8,989,990 B2* | 3/2015 | Kuroki | .................... | F02B 43/10 123/568.21 |
| 2011/0067664 A1* | 3/2011 | Kuroki | .................... | F02B 43/10 123/1 A |
| 2012/0227713 A1* | 9/2012 | Kuroki | .................... | F02D 21/08 123/568.11 |
| 2014/0299111 A1* | 10/2014 | Denz | .................. | F02M 35/1038 123/521 |

FOREIGN PATENT DOCUMENTS

| | | |
|---|---|---|
| JP | 2005-054696 A | 3/2005 |
| JP | 2006-250024 A | 9/2006 |
| JP | 2007-127010 A | 5/2007 |
| JP | 2010-209801 A | 9/2010 |

\* cited by examiner

DETECTION METHOD OF AIRTIGHT FAILURE IN WORKING-GAS CIRCULATING TYPE GAS ENGINE, AND WORKING-GAS CIRCULATING TYPE GAS ENGINE USING THE METHOD

CROSS REFERENCE TO RELATED APPLICATIONS

This is a National Stage of International Application No. PCT/JP2011/065796 filed Jul. 11, 2011, the content of all of which is incorporated herein by reference in its entirety.

TECHNICAL FIELD

The present invention relates to a detection method of an airtight failure in a working-gas circulating type gas engine, and a working-gas circulating type gas engine using the method.

BACKGROUND ART

Conventionally, a working-gas circulating type gas engine in which fuel gas (for example, hydrogen), oxidizer gas (for example, oxygen), and a working gas (for example, inactive gas) are supplied to a combustion chamber and the fuel gas is burnt while the working gas in the burnt gas discharged from the combustion chamber is circulated to the combustion chamber through a circulation passage has been proposed. It is desirable that the above-mentioned working gas is inactive, as well as has a large ratio of specific heats and raises the thermal efficiency of the engine. Therefore, as the above-mentioned working gas, for example, helium, neon, argon, etc., which are the single atomic gas belonging to rare gasses, can be exemplified. Actually, as a working gas of such an engine, argon is widely used among these.

In the burnt gas of such an engine, the combustion product produced by combustion of fuel gas (for example, $H_2O$ (water vapor), $CO_2$ (carbon dioxide), etc.) and working gas (for example, argon, helium, etc.) are contained. Among these, especially water vapor is gas of a three-atom molecule and its ratio of specific heats is smaller as compared with not only inactive gases of a single atom, such as argon and helium, but also air or nitrogen (refer to FIG. 1). Therefore, when exhaust gas containing water vapor with such a low ratio of specific heats is re-supplied to a combustion chamber as it is, the ratio of specific heats as the whole working gas will fall, and the thermal efficiency of the engine will fall as a result. Therefore, the above-mentioned engine generally includes a circulation passage for circulating (re-supplying) the burnt gas discharged from a combustion chamber to the combustion chamber therethrough, and a combustion product removing means (for example, a condensation machine, adsorption material, etc.) interposed in the circulation passage to separate and remove the combustion product (for example, $H_2O$ (water vapor), $CO_2$ (carbon dioxide), etc.) contained in the burnt gas.

A working-gas circulating type gas engine is a so-called kind of "a closed cycle engine", the airtightness of a circulation passage, through which the burnt gas discharged from a combustion chamber is circulated (re-supply) to the combustion chamber, needs to be maintained. If a leak arises in this circulation passage, the circulating gas containing working gas will leak out into the atmosphere, or the air in the atmosphere will flow into the circulation passage conversely. Since nitrogen (and oxygen) which is the main component of air has lower ratio of specific heats as compared with gas of inactivity single atom (for example, argon) used as working gas as shown in FIG. 1, if air flows into a circulation passage, the ratio of specific heats as the whole circulating gas falls, and there is a possibility that the temperature and pressure in the combustion chamber near a top dead center (TDC) may decline and/or the thermal efficiency of the engine may fall, and thereby normal operation may become impossible.

Therefore, in a working-gas circulating type gas engine, it is necessary to quickly and precisely judge the existence of an airtight failure in a circulation passage of burnt gas. In the art, for example, there is an approach to detect leak of gaseous fuel by closing the cutoff valve disposed in a fuel supplying passage which communicates a fuel tank in which the gaseous fuel is stored and a fuel supplying means on the side of an engine in a hybrid car (HV) and detecting the pressure between the cutoff valve and the fuel supplying means by a pressure sensing means (for example, refer to PLT 1).

However, the conventional technology as mentioned above is intended to detect leak in supplying system of gaseous fuel, there is sufficient pressure difference from the open air originally, and therefore it is easy to ensure of the detectability of leak of gaseous fuel. However, in the circulation passage of a working-gas circulating type gas engine as mentioned above, unless special countermeasures are taken, it is difficult to expect sufficient pressure difference from the open air, and it is difficult to detect the leak of circulating gas out of a circulation passage into the atmosphere and/or, conversely, the invasion of the air in the atmosphere into a circulation passage.

There is another approach in the art to conduct an airtight inspection even in the configuration in which it is difficult to expect sufficient pressure difference from the open air unless special countermeasures are taken as described above. For example, there are approaches to close the evaporated fuel supplying system (including a canister) from a fuel tank in which liquid fuel is stored to an air intake system of an engine by a cutoff valve, pressure the enclosed space with a pressurization pump, detect the change of the pressure in the enclosed space with a pressure sensor, and thereby judge the leak in the enclosed space (for example, refer to PTL 2 and PTL 3).

However, in the conventional technology as mentioned above, in order to attain sufficient pressure difference from the open air to ensure the detectability, a pressurizing means such as a pressurization pump is needed. Moreover, when a pressurization pump is disposed in the passage which communicates a canister and the external world, there is a possibility that pressure loss in the passage may result from the exhaust gas at the time of fuel supply and the air intake at the time of purge processing of evaporated fuel going via the pressurizing means or a foreign substance (dust, water) may be mixed in a pressurizing means in association with exhaust at the time of fuel supply or intake at the time of purge processing of evaporated fuel. For example, in PTL (Patent Literature) 2, in order to prevent such inconvenience, a bypass between a passages which communicates a canister and the external world and a passage which communicates the canister and a fuel tank, and a pressurizing means is interposed in the bypass.

That is, in the conventional technology as mentioned above, it is necessary to newly dispose a pressurizing means, a bypass, etc. and, as a result, it lead to causing enlargement and complication of the system containing such a working-gas circulating type gas engine, and increase in cost. As mentioned above, in the art, there has been a continuous demand to a brief technology for detecting an airtight failure in a working-gas circulating type gas engine with sufficient accuracy and at low cost.

CITATION LIST

Patent Literature

[PTL 1] Japanese Patent Application Laid-Open (kokai) No. 2006-250024
[PTL 2] Japanese Patent Application Laid-Open (kokai) No. 2005-54696
[PTL 3] Japanese Patent Application Laid-Open (kokai) No. 11-336620

SUMMARY OF INVENTION

Technical Problem

As mentioned above, in the art, there has been a continuous demand to a brief technology for detecting an airtight failure in a working-gas circulating type gas engine with sufficient accuracy and at low cost. That is, the present invention has been conceived in order to meet such a demand. More specifically, the present invention has an objective to provide a brief method for detecting an airtight failure in a working-gas circulating type gas engine with sufficient accuracy and at low cost and a working-gas circulating type gas engine which uses the method.

Solution to Problem

The above-mentioned objective of the present invention can be attained by
a detection method of an airtight failure in a working-gas circulating type gas engine,
said working-gas circulating type gas engine leads fuel gas, oxidizer gas, and working gas to a combustion chamber and burns said fuel gas in the combustion chamber to obtain motive power, and
said working-gas circulating type gas engine comprises:
a fuel gas supplying means to supply said fuel gas,
an oxidizer gas supplying means to supply said oxidizer gas,
a working-gas supplying means to supply said working gas,
a sealed circulation passage which circulates burnt gas emitted from an exhaust port which communicate to said combustion chamber to an intake port which communicates to said combustion chamber circulate therethrough, and
a combustion product removing means to separate and remove combustion product produced by combustion of said fuel gas from said burnt gas, characterized in that;
said working-gas circulating type gas engine further comprises:
a gas quantity detecting means to detect gas quantity in said circulation passage, and
an airtightness judging means to judge the airtightness of said circulation passage, and
said detection method includes:
a surplus gas supplying step in which at least one of said fuel gas, said oxidizer gas, and said working gas in an extra predetermined quantity 1 in addition to the quantity needed for compensating for the decline associated with operation of the engine is supplied as surplus gas into said circulation passage, a circulating gas increase detecting step in which a circulating gas increase which is an increment of the quantity of gas in said circulation passage before and after said surplus gas supplying step is detected by said gas quantity detecting means, and
an airtightness judging step in which it is judged that there is an airtight failure in said working-gas circulating type gas engine when the absolute value of a quantity deviation of circulation gas which is the difference between said predetermined quantity 1 and said circulating gas increase is a predetermined quantity 2 or more, while it is judged that there is no airtight failure in said working-gas circulating type gas engine when the absolute values of said quantity deviation of circulation gas is less than said predetermined quantity 2.

Moreover, the above-mentioned objective of the present invention can be also attained by
a working-gas circulating type gas engine, which leads fuel gas, oxidizer gas, and working gas to a combustion chamber and burns said fuel gas in the combustion chamber to obtain motive power, and comprises:
a fuel gas supplying means to supply said fuel gas,
an oxidizer gas supplying means to supply said oxidizer gas,
a working-gas supplying means to supply said working gas,
a sealed circulation passage which circulates burnt gas emitted from an exhaust port which communicate to said combustion chamber to an intake port which communicates to said combustion chamber circulate therethrough, and
a combustion product removing means to separate and remove combustion product produced by combustion of said fuel gas from said burnt gas, characterized in that;
said working-gas circulating type gas engine further comprises:
a gas quantity detecting means to detect gas quantity in said circulation passage, and
an airtightness judging means to judge the airtightness of said circulation passage, and
in said working gas circulating type gas engine: at least one of said fuel gas supplying means, said oxidizer gas supplying means, and said working-gas supplying means supplies at least one of said fuel gas, said oxidizer gas, and said working gas in an extra predetermined quantity 1 in addition to the quantity needed for compensating for the decline associated with operation of the engine is supplied as surplus gas into said circulation passage,
said gas quantity detecting means detects a circulating gas increase which is an increment of the quantity of gas in said circulation passage before and after supplying of said surplus gas into said circulation passage, and
said airtightness judging means judges that there is an airtight failure in said working-gas circulating type gas engine when the absolute value of a quantity deviation of circulation gas which is the difference between said predetermined quantity 1 and said circulating gas increase is a predetermined quantity 2 or more, while said airtightness judging means judges that there is no airtight failure in said working-gas circulating type gas engine when the absolute values of said quantity deviation of circulation gas is less than said predetermined quantity 2.

Advantageous Effects of Invention

As mentioned above, in accordance with the present invention, at least one of fuel gas, oxidizer gas, and working gas in an extra predetermined quantity 1 is supplied as surplus gas into a circulation passage and, based on the difference between this predetermined quantity 1 and the increment of the quantity of the gas in the circulation passage separately detected by a gas quantity detecting means, it is judged whether an airtight failure in a working-gas circulating type gas engine exists or not. As a result, in accordance with the present invention, an airtight failure in a working-gas circulating type gas engine can be detected by a brief configuration and method at low cost and with sufficient accuracy.

DESCRIPTION OF EMBODIMENTS

Figure 1:
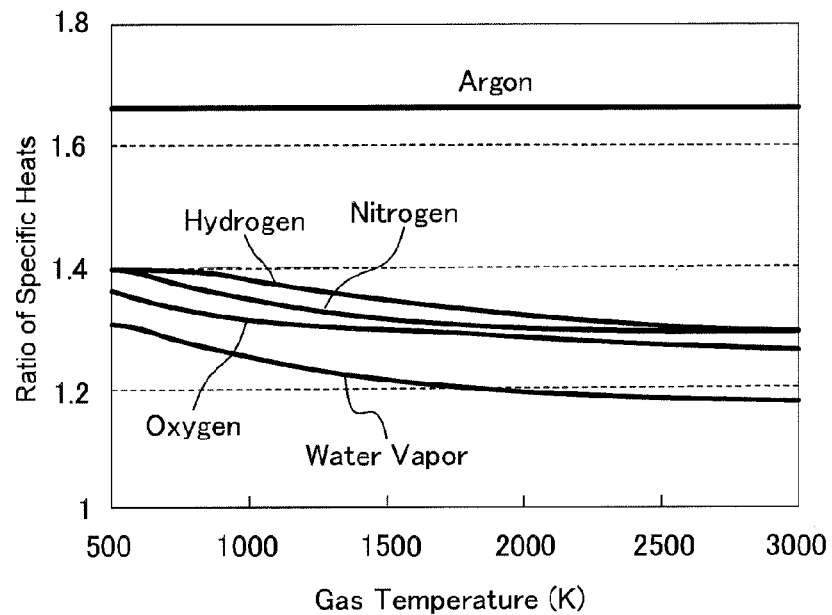
FIG. 1 A graph for comparing the ratios of specific heats of various gases.

As mentioned above, the present invention has an objective to provide a brief method for detecting an airtight failure in a working-gas circulating type gas engine with sufficient accuracy and at low cost and a working-gas circulating type gas engine which uses the method.

As a result of wholehearted research for achieving the above-mentioned objective, the present inventors have come to conceive detecting an airtight failure in a working-gas circulating type gas engine with sufficient accuracy by supplying as surplus gas at least one of fuel gas, oxidizer gas, and working gas in an extra predetermined quantity 1 into a circulation passage and judging whether an airtight failure of the working-gas circulating type gas engine exists or not based on the difference between this predetermined quantity 1 and the increment of the quantity of the gas in the circulation passage separately detected by a gas quantity detecting means.

Namely, the first embodiment of the present invention is, a detection method of an airtight failure in a working-gas circulating type gas engine, said working-gas circulating type gas engine leads fuel gas, oxidizer gas, and working gas to a combustion chamber and burns said fuel gas in the combustion chamber to obtain motive power, and said working-gas circulating type gas engine comprises:

a fuel gas supplying means to supply said fuel gas, an oxidizer gas supplying means to supply said oxidizer gas, a working-gas supplying means to supply said working gas, a sealed circulation passage which circulates burnt gas emitted from an exhaust port which communicate to said combustion chamber to an intake port which communicates to said combustion chamber circulate therethrough, and a combustion product removing means to separate and remove combustion product produced by combustion of said fuel gas from said burnt gas, characterized in that;

said working-gas circulating type gas engine further comprises:

a gas quantity detecting means to detect gas quantity in said circulation passage, and an airtightness judging means to judge the airtightness of said circulation passage, and said detection method includes:

a surplus gas supplying step in which at least one of said fuel gas, said oxidizer gas, and said working gas in an extra predetermined quantity 1 in addition to the quantity needed for compensating for the decline associated with operation of the engine is supplied as surplus gas into said circulation passage, a circulating gas increase detecting step in which a circulating gas increase which is an increment of the quantity of gas in said circulation passage before and after said surplus gas supplying step is detected by said gas quantity detecting means, and an airtightness judging step in which it is judged that there is an airtight failure in said working-gas circulating type gas engine when the absolute value of a quantity deviation of circulation gas which is the difference between said predetermined quantity 1 and said circulating gas increase is a predetermined quantity 2 or more, while it is judged that there is no airtight failure in said working-gas circulating type gas engine when the absolute values of said quantity deviation of circulation gas is less than said predetermined quantity 2.

As mentioned above, the above-mentioned working-gas circulating type gas engine supplies fuel gas, oxidizer gas, and working gas to a combustion chamber, burns the fuel gas, and obtains motive power.

As the above-mentioned working gas, for example, various gas, such as air and nitrogen, can be used. However, as mentioned above, as the above-mentioned working gas, it is desirable to use inactive gas with a larger ratio of specific heats than that of air, such as argon, helium, and neon, as working gas. When such gas with a large ratio of specific heats is used as a working gas, as compared with the case where gas with a comparatively small ratio of specific heats (for example, air, nitrogen, etc.) is used as working gas, an engine can be operated at higher thermal efficiency, and more stable combustion can be realized.

Figure 2:
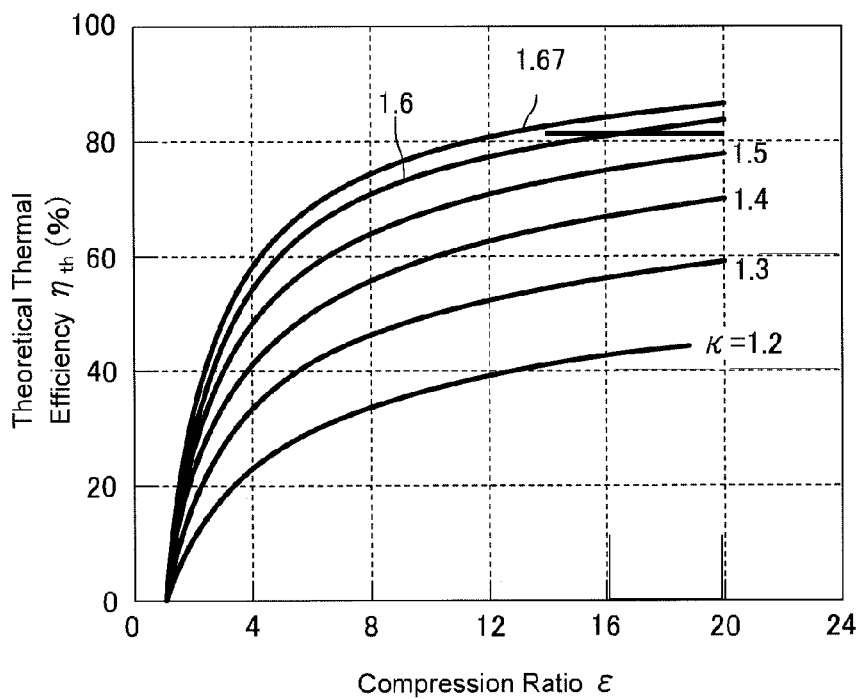
FIG. 2 A graph showing the relation of the theoretical thermal efficiency over the compression ratio in engines using various working gases with various ratios of specific heats.

Namely, as apparent from the relation of the theoretical thermal efficiency over the compression ratio in engines using various working gases with various ratios of specific heats, which is shown in FIG. 2, the higher the ratio of specific heats of working gas is, the higher the thermal efficiency of an engine becomes. Specifically, the theoretical thermal efficiency ($\eta_{t\ h}$) of an engine is expressed by the following formula (1) using a compression ratio $\epsilon$ and a ratio of specific heats $\kappa$ of working gas.

[Formula 1]

$$f_{th} = 1 - \epsilon^{(1-\kappa)} \quad (1)$$

Moreover, when cylinder pressures before and after compression with a piston are expressed by P1 and P2, respectively, a compression ratio is expressed by $\epsilon$, and the ratio of specific heats of working gas is expressed by $\kappa$, the relation among these is expressed by the following formula (2).

[Formula 2]

$$P2 = P1 \times \epsilon^{\kappa} \quad (2)$$

For a cylinder temperature, a similar relation is true. Namely, when the ratio of specific heats of working gas falls, the cylinder pressures and cylinder temperatures before and after compression with a piston will also fall, and it will lead to aggravation of a combustion state.

The above-mentioned working gas can be stored in a working-gas storage part (for example, a tank, a cylinder, etc.). Moreover, the above-mentioned working gas can be filled into a circulation passage of an engine from the working-gas storage part, for example through a working-gas supply passage communicated with a fill opening disposed on the circulation passage of the engine.

For example, the above-mentioned working-gas supply passage can be configured so that a valving element 153 which opens and closes in response to direction signals from an electrical control unit (ECU), which will be mentioned later, may be interposed thereinto and a working gas may be supplied (filled) into the circulation passage by the pressure of the working gas when the working-gas supply passage is opened by the valving element 153. Furthermore, the pressure used for filling the working gas may be based on, for example, the pressure of the working gas in a working-gas tank as a working-gas storage part, or may be based on, for example, the pressure of the working gas raised by a compression machine (for example, a compressor, a pump, etc.) for heightening the pressure of the working gas. Furthermore, the pressure used for filling the working gas may be also regulated by a filling pressure adjustment means (for example, a pressure regulator etc.) interposed between the working-gas storage part and the fill opening so that it may not become more than a certain set pressure.

Although an example of configurations of a working-gas supplying means for supplying working gas to a working-gas circulating type gas engine has been explained as mentioned above, configurations of a working-gas supplying means are not limited to the above, and may be any configuration as long as it can supply working gas to a working-gas circulating type gas engine.

As the above-mentioned fuel gas, various fuel, such as natural gas, propane, and hydrogen, etc., can be used. The above-mentioned fuel gas can be stored in a fuel gas storage part (for example, a tank, a cylinder, etc.). Moreover, for example, the above-mentioned fuel gas may be directly injected into a combustion chamber of an engine (what is called "direct injection"), or may be preliminarily mixed with working gas by injecting into an inlet port of an engine.

For example, an injection means for injecting fuel gas in such manners may be a fuel injection valve which opens and closes its injection opening(s) with valving element(s) in response to direction signals from an electrical control unit (ECU), which will be mentioned later, and injects fuel gas with the pressure of the fuel gas being supplied to the injection means when the injection opening(s) is opened by the valving element(s). Furthermore, the pressure used for injecting fuel gas may be based on, for example, the pressure of the fuel gas in a fuel gas tank as a fuel gas storage part, or may be based on, for example, the pressure of the fuel gas raised by a compression machine (for example, a compressor, a pump, etc.) for heightening the pressure of the fuel gas. Furthermore, the pressure used for injecting fuel gas may be also regulated by an injection pressure adjustment means (for example, a pressure regulator etc.) interposed between the fuel gas storage part and the injection means so that it may not become more than a certain set pressure.

Although an example of configurations of a fuel gas supplying means for supplying fuel gas to a working-gas circulating type gas engine has been explained as mentioned above, configurations of a fuel gas supplying means are not limited to the above, and may be any configuration as long as it can supply fuel gas to a working-gas circulating type gas engine.

Although oxidizer gas used for burning the above-mentioned fuel gas is not limited as long as it can burn the above-mentioned fuel gas, as an example, for example, oxygen can be exemplified. Oxidizer gas can be stored in an oxidizer gas storage part, such as a cylinder. Moreover, from the oxidizer gas storage part, for example, oxidizer gas may be directly injected into a combustion chamber of an engine or may be preliminarily mixed with working gas before being supplied in the combustion chamber of the engine.

For example, an injection means for injecting oxidizer gas in such manners may be an injection valve 143 which opens and closes its injection opening(s) with valving element(s) in response to direction signals from an electrical control unit (ECU), which will be mentioned later, and injects oxidizer gas with the pressure of the oxidizer gas being supplied to the injection means when the injection opening(s) is opened by the valving element(s), similarly to an injection means for injecting fuel gas. Furthermore, the pressure used for injecting oxidizer gas may be based on, for example, the pressure of the oxidizer gas in an oxidizer gas tank as an oxidizer gas storage part, or may be based on, for example, the pressure of the oxidizer gas raised by a compression machine (for example, a compressor, a pump, etc.) for heightening the pressure of the oxidizer gas. Furthermore, the pressure used for injecting oxidizer gas may be also regulated by an injection pressure adjustment means (for example, a pressure regulator etc.) interposed between the oxidizer gas storage part and the injection means so that it may not become more than a certain set pressure.

Although an example of configurations of an oxidizer gas supplying means for supplying oxidizer gas to a working-gas circulating type gas engine has been explained as mentioned above, configurations of an oxidizer gas supplying means are not limited to the above, and may be any configuration as long as it can supply oxidizer gas to a working-gas circulating type gas engine.

Furthermore, the combustion mode of the above-mentioned fuel gas can be suitably chosen in accordance with the properties of the fuel gas used, the specification of an engine, etc. More specifically, for example, fuel gas may be directly injected into a combustion chamber at a predetermined time within a period in a high compression state where gas containing at least oxidizer gas and working gas is compressed in the combustion chamber (what is called "high-pressure injection") and diffuse combustion of the fuel gas may be carried out. Moreover, fuel gas preliminarily mixed with working gas as mentioned above may be ignited by sparks generated from an ignition means disposed in a combustion chamber and spark-ignited combustion may be carried out.

As mentioned above, a working-gas circulating type gas engine leads fuel gas, oxidizer gas, and working gas to a combustion chamber, burns the fuel gas in the combustion chamber, and obtains motive power. Moreover, a working-gas circulating type gas engine makes burnt gas discharged from the combustion chamber circulate to the combustion chamber through a circulation passage. Since the burnt gas contains combustion product(s) which is generated as a result of the combustion of the fuel gas and the combustion product(s) is generated every time when the fuel gas burns, the combustion product(s) is accumulated in the burnt gas and continues increasing unless being removed from the burnt gas by a method of some kind. Therefore, a working-gas circulating type gas engine needs to be equipped with a combustion product removing means to separate and remove the combustion product(s) produced by combustion of fuel gas from a burnt gas.

In addition, combustion product(s) differs depending on the kind of substance used as fuel gas. Therefore, a combustion product removing means in accordance with the kind of substance used as fuel gas is also needed. For example, when hydrogen is used as fuel gas, $H_2O$ (water vapor) is contained in burnt gas. In this case, the engine is generally equipped with a circulation passage for circulating (re-supplying) the burnt gas discharged from a combustion chamber to a combustion chamber and a condensation machine which is interposed into the circulation passage and condenses $H_2O$ (water vapor) contained in the burnt gas to separate and remove it. Alternatively, instead of a condensation machine or in addition to a condensation machine, an adsorption material which adsorbs $H_2O$ (water vapor) may be disposed in a circulation passage.

Moreover, for example, when hydrocarbon system fuel gas is used, not only $H_2O$ (water vapor), but also $CO_2$ (carbon dioxide) is contained in burnt gas. In this case, as for the engine, in general, not only a means for separating and removing $H_2O$ (water vapor) as mentioned above, but also a means for separating and removing $CO_2$ (carbon dioxide) is disposed in a circulation passage. As such a means for separating and removing $CO_2$ (carbon dioxide), for example, monoethanolamine solution which dissolves and absorbs $CO_2$ (carbon dioxide), zeolite system adsorbent which adsorb $CO_2$ (carbon dioxide), etc. can be exemplified.

In addition to the above, a working-gas circulating type gas engine to which a detection method of an airtight failure in a working-gas circulating type gas engine according to the present embodiment is further equipped with a gas quantity detecting means to detect gas quantity in a circulation passage, and an airtightness judging means to judge the airtightness of the circulation passage, as mentioned above.

The above-mentioned gas quantity detecting means is not limited to a specific composition or system, as long as it can detect the gas quantity in a circulation passage. For example, the above-mentioned gas quantity detecting means may be a gas pressure detecting means to detect the pressure of the gas in a circulation passage. In this case, the above-mentioned gas quantity detecting means detects the gas quantity in a circulation passage based on the pressure of the gas in the circulation passage detected by a gas pressure detecting means.

In addition, as a specific detection method of the gas quantity in a circulation passage, a suitable method can be chosen among various methods well-known to a person skilled in the art in accordance with the configuration of an engine, etc. For example, by disposing the above-mentioned gas quantity detecting means in the upper stream of supplying means of fuel gas, oxidizer gas, or working gas disposed on a circulation passage, the gas quantity in the circulation passage can be detected.

As mentioned above, since a gas quantity detecting means generates a measurement signal (detection signal) corresponding to the gas quantity in a circulation passage, for example, a gas pressure detecting means can be connected to an electrical control unit (ECU) and can be used for various controls performed by the unit. Incidentally, an electrical control unit (ECU: Electronic Control Unit) refers to, for example, an electronic device which mainly consists of a well-known microcomputer comprising a central processing unit (CPU: Central Processing Unit), a memory storage, such as ROM (Read Only Memory), RAM (Random Access Memory), and nonvolatile memory, and an interface. However, the above-mentioned explanation about a gas quantity detecting means and ECU is absolutely an exemplification, and the configurations of a gas quantity detecting means and ECU are not limited to the above-mentioned explanation.

As mentioned above, a detection method of an airtight failure in a working-gas circulating type gas engine, according to the present embodiment is applied to a working-gas circulating type gas engine which has been explained above, and includes:

a surplus gas supplying step in which at least one of said fuel gas, said oxidizer gas, and said working gas in an extra predetermined quantity 1 in addition to the quantity needed for compensating for the decline associated with operation of the engine is supplied as surplus gas into said circulation passage, a circulating gas increase detecting step in which a circulating gas increase which is an increment of the quantity of gas in said circulation passage before and after said surplus gas supplying step is detected by said gas quantity detecting means, and an airtightness judging step in which it is judged that there is an airtight failure in said working-gas circulating type gas engine when the absolute value of a quantity deviation of circulation gas which is the difference between said predetermined quantity 1 and said circulating gas increase is a predetermined quantity 2 or more, while it is judged that there is no airtight failure in said working-gas circulating type gas engine when the absolute values of said quantity deviation of circulation gas is less than said predetermined quantity 2.

First, in a surplus gas supplying step, as mentioned above, at least one of fuel gas, oxidizer gas, and working gas in an extra predetermined quantity 1 in addition to the quantity needed for compensating for the decline associated with operation of the engine is supplied as surplus gas into a circulation passage. Thereby, the quantity of the gas in the circulation course should increase by only the predetermined quantity 1. In addition, the predetermined quantity 1 can be suitably set, taking into consideration, for example, the accuracy of supply quantity control of the supplying means of the gas supplied as surplus gas, the detection accuracy of a gas quantity detecting means, etc.

Moreover, the above-mentioned predetermined quantity 1 of surplus gas may be supplied in one combustion cycle of the engine, or may be gradually supplied dividedly in plural combustion cycles of the engine so that the sum total of the quantities of the surplus gas supplied into a circulation passage in the plural combustion cycles may be the predetermined quantity 1. In any case, when the quantity of the surplus gas supplied into the circulation passage reaches the above-mentioned predetermined quantity 1, supply of surplus gas will be stopped.

Here, the gas supplied as surplus gas into a circulation passage may be any of fuel gas, oxidizer gas, and working gas, and combination of two or more sorts of gas (for example, fuel gas and working gas, oxidizer gas and working gas, etc.) may be supplied. However, since it is necessary to take into consideration the quantity to be consumed by combustion of fuel gas in a combustion chamber in the judgment in an airtightness judging step in the case of the combination of fuel gas and oxidizer gas and therefore judgment conditions becomes more complicated, it is desirable to avoid combinations including the combination of fuel gas and oxidizer gas. It is more desirable to supply only one of fuel gas, oxidizer gas, and working gas, as surplus gas, into a circulation passage.

Next, in a circulating gas increase detecting step, as mentioned above, a circulating gas increase, which is an increment of the quantity of gas in the circulation passage before and after the surplus gas supplying step, is detected by the gas quantity detecting means. More specifically, the quantities of gas in the circulation passage before and after the surplus gas supplying step are respectively detected by the gas quantity detecting means, and the difference of these quantities is detected as a circulating gas increase which is an increment of the quantity of gas in a circulation passage. Namely, the circulating gas increase is an actual measured value of the increased quantity of the circulating gas in a circulation passage accompanying supply of the surplus gas in the surplus gas supplying step.

In an airtightness judging step, as mentioned above, the absolute value of a quantity deviation of circulation gas which is the difference between the predetermined quantity 1 and the circulating gas increase is obtained. More specifically, the absolute values of the quantity deviation of circulation gas is obtained by deducting the circulating gas increase from the predetermined quantity 1 and calculating the absolute value of the result. Namely, the absolute values of the quantity deviation of circulation gas is the absolute values of the difference between the supply quantity of the surplus gas into the circulation passage and the actual measured value of the increased quantity of the circulating gas in the circulation passage. Subsequently, it is judged that there is an airtight failure in the working-gas circulating type gas engine when the absolute value of the quantity deviation of circulation gas is a predetermined quantity 2 or more, while it is judged that there is no airtight failure in the working-gas circulating type gas engine when the absolute values of the quantity deviation of circulation gas is less than the predetermined quantity 2.

Here, the above-mentioned predetermined quantity 2 is a threshold value for judging the existence of an airtight failure in a working-gas circulating type gas engine based on the absolute value of the above-mentioned quantity deviation of circulation gas. In other words, it can be said that the above-mentioned predetermined quantity 2 is the maximum acceptable value of the difference between the quantity of the surplus gas which must have been supplied by the above-mentioned supplying means into the circulation passage as surplus gas (predetermined quantity 1) and the increment of the quantity of the gas in the circulation passage actually detected by the gas quantity detecting means (circulating gas increase). In addition, the predetermined quantity 2 can be suitably set, taking into consideration, for example, the accuracy of supply quantity control of the supplying means of the gas supplied as surplus gas, the detection accuracy of a gas quantity detecting means, etc.

In the above-mentioned airtightness judging step, the above-mentioned airtightness judging means can judge the existence of an airtight failure in a circulation passage based on the predetermined quantity 2 as such a threshold value, and the judgment result can be used, for example, for conditional branching for judging whether other processing, such as an alert informing the airtight failure in the circulation passage, prohibition of engine re-starting, etc. can be performed or not, etc.

In addition, the above-mentioned predetermined quantity 1 and the predetermined quantity 2 may be stored, for example, in memory storage which ECU comprises, such as ROM or RAM, together with a program as an algorithm for judging the existence of an airtight failure in the circulation passage, and referred to when CPU, which ECU comprises, performs a processing specified by a program corresponding to the algorithm (for example, judgment of the existence of an airtight failure in the circulation passage, etc.)

As mentioned above, in accordance with a detection method of an airtight failure in a working-gas circulating type gas engine according to the present embodiment, the airtight failure in the working-gas circulating type gas engine can be detected with sufficient accuracy by supplying as surplus gas at least one of fuel gas, oxidizer gas, and working gas in an extra predetermined quantity 1 into a circulation passage, and judging the existence of an airtight failure in the working-gas circulating type gas engine based on the difference (absolute values of the quantity deviation of circulation gas) between the quantity of the surplus gas which must have been thus supplied into the circulation passage (predetermined quantity 1) and the increment of the quantity of the gas in the circulation passage actually detected by a gas quantity detecting means (circulating gas increase).

By the way, as the above-mentioned fuel gas used in a working-gas circulating type gas engine according to the present invention, for example, various fuel, such as natural gas, propane, and hydrogen can be used. However, as mentioned above, in a working-gas circulating type gas engine, it is necessary to remove combustion product(s) resulting from combustion of fuel gas in a combustion chamber from burnt gas. Moreover, from a viewpoint of earth environment protection, it is desirable that combustion product(s) is harmless to natural environment and the influence on global warming is small. From such a viewpoint, as the above-mentioned fuel gas, what produces only harmless combustion product(s) easily removable from burnt gas is desirable. Specifically, as the above-mentioned fuel gas, hydrogen is desirable. When hydrogen is used as fuel, only water ($H_2O$), which can be easily removed from burnt gas and is harmless, is produced as combustion product. Therefore, it is desirable.

Moreover, the above-mentioned oxidizer gas may be any kind of oxidizer gas, as long as it can oxidize fuel in a combustion chamber of an engine to produce heat and it can expand a working gas to produce motive power. However, in general, oxidizer also produces its reduced form in addition to the oxidized from of fuel as the result of oxidization (combustion) of fuel (substance to be oxidized). In a working-gas circulating type gas engine, it is necessary to also remove such oxidized form and reduced form from burnt gas. From such a viewpoint, as the above-mentioned oxidizer gas, it is desirable to use what produces only the oxidized from of fuel gas and reduced form of oxidizer gas which can be easily removed from burnt gas. Specifically, as the above-mentioned oxidizer gas, oxygen is desirable. When oxygen as oxidizer gas is used in combination with hydrogen as above-mentioned desirable fuel gas, since only water ($H_2O$) which is an oxidized form of fuel gas (hydrogen) and is also a reduced form of oxidizer gas (oxygen) will be produced as combustion product. Therefore, it is desirable.

Furthermore, although various gas, such as air and nitrogen, can be used as the above-mentioned working gas, from a viewpoint of raising the thermal efficiency of an engine, it is desirable to use gas with a large ratio of specific heats. Moreover, from a viewpoint of not generating a harmful substance with combustion of fuel in a combustion chamber, it is desirable to use inactive gas. Specifically, as the above-mentioned working gas, it is desirable to use inactive single atomic gas, for example, such as argon, neon, helium etc. When such gas with a large ratio of specific heats is used as a working gas, as compared with the case where gas (for example, air, nitrogen, etc.) with a comparatively small ratio of specific heats is used as working gas, an engine can be operated at higher thermal efficiency. Moreover, since these are is inactive rare gases, for example, these do not generate a toxic substance like nitrogen oxide ($NO_x$) produced when using air as working gas. Therefore, these are desirable. Among these, argon is widely used as working gas in a working-gas circulating type gas engine.

Therefore, the second embodiment of the present invention is, a detection method of an airtight failure in a working-gas circulating type gas engine according to said first embodiment of the present invention, characterized in that;

said fuel gas, oxidizer gas, and working gas are hydrogen, oxygen, and argon, respectively.

As mentioned above, when hydrogen, oxygen, and argon are used, respectively, as the above-mentioned fuel gas, oxidizer gas, and working gas, only water ($H_2O$) is produced as combustion product. Since the combustion product can be easily removed from burnt gas and the thermal efficiency of the engine increases due to the high ratio of specific heats of working gas and further working gas is inactivity and no toxic substance is generated with combustion of fuel, the combination of these fuel gas, oxidizer gas, and working gas is extremely desirable.

By the way, as mentioned above, the above-mentioned gas quantity detecting means is not limited to a specific configuration or system, as long as the gas quantity in a circulation passage can be detected. For example, the above-mentioned gas quantity detecting means may be a gas pressure detecting means to detect the pressure of the gas in a circulation passage. Namely, the above-mentioned gas quantity detecting means may detect the gas quantity in a circulation passage based on the pressure of the gas in the circulation passage detected by a gas pressure detecting means.

Therefore, the third embodiment of the present invention is, a detection method of an airtight failure in a working-gas circulating type gas engine according to one of said first or second embodiment of the present invention, characterized in that;

said gas quantity detecting means is a gas pressure detecting means to detect the pressure of the gas in said circulation passage.

The above-mentioned gas pressure detecting means is not limited to a specific system, and can be configured so as to include any of various types of pressure sensors (for example, an electric capacity system pressure sensor, a semiconductor type pressure sensor, etc.) widely used in the art. Moreover, the above-mentioned gas pressure detecting means may be configured so as to detect the pressure of the gas in a circulation passage to generate a measurement signal (detection signal) representing the pressure of the gas in the circulation passage. In this case, the above-mentioned gas quantity detecting means will detect the pressure of the gas in a circulation passage and will generate the measurement signal (detection signal) representing the pressure of the gas in the circulation passage.

By the way, in a detection method of an airtight failure in a working-gas circulating type gas engine according to the present invention, as mentioned above, for the purpose of detecting an airtight failure in a working-gas circulating type gas engine, at least one of fuel gas, oxidizer gas, and working gas in an extra predetermined quantity 1 in addition to the quantity needed for compensating for the decline associated with operation of the engine is supplied as surplus gas into a circulation passage.

As mentioned above, the above-mentioned surplus gas is excessively supplied into a circulation passage for one combustion cycle or more of the engine and thereby the above-mentioned surplus gas in an extra (preliminarily determined) predetermined quantity 1 in addition to the quantity needed for compensating for the decline associated with operation of the engine is supplied into the circulation passage. Then, supply of the surplus gas is stopped (namely, only the quantity needed for compensating for the decline associated with operation of the engine is supplied), as mentioned above, in a circulating gas increase detecting step, a circulating gas increase is detected by a gas quantity detecting means, and the existence of an airtight failure in the working-gas circulating type gas engine is judged based on the absolute value of the quantity deviation of circulating gas in an airtightness judging step.

Namely, if this goes on, unless the surplus gas supplied as mentioned above is reduced by a method of some kind, the surplus gas in an extra predetermined quantity 1 is accumulated as supplied in the circulation passage. In the state where surplus gas was thus supplied in the circulation passage, as compared with a usual state where surplus gas is not supplied, the pressure of the gas in a circulation passage is higher and, as a result, if the gas is compressed with the same compression ratio as the usual state, the maximum cylinder pressure ($P_{max}$) becomes higher needlessly, and it is not desirable from a viewpoint of the operational efficiency and design strength of an engine. Therefore, after detecting the existence of an airtight failure in the engine, it is desirable to reduce the surplus gas supplied in a circulation passage as immediately as possible and to return the pressure of the gas in the circulation passage back to a usual state. However, when fuel gas or oxidizer gas is supplied as surplus gas, these gases are consumed in a combustion cycle of the engine. Therefore, if the quantity of the gas corresponding to the surplus gas supplied into the circulation passage after the end of the circulating gas increase detecting step is less than the quantity needed for compensating for the decline associated with operation of the engine, the surplus gas accumulated as mentioned above will be consumed with combustion to decrease.

As mentioned above, when fuel gas or oxidizer gas, which is gas consumed in a combustion cycle of an engine, is supplied as surplus gas, even if a special measure, such as new installation of an apparatus for decreasing surplus gas excessively supplied into a circulation passage, is not taken, only by making the quantity of the gas corresponding to the surplus gas supplied into the circulation passage after the end of the circulating gas increase detecting step less than the quantity needed for compensating for the decline associated with operation of the engine, the accumulated surplus gas is consumed with combustion, and the quantity of the gas corresponding to the surplus gas in the circulation passage can be returned back to the quantity before the circulating gas increase detecting step in due course. Therefore, it is convenient.

Therefore, the fourth embodiment of the present invention is, a detection method of an airtight failure in a working-gas circulating type gas engine according to one of said first to third embodiments of the present invention, characterized in that;

said surplus gas is in any of said fuel gas or said oxidizer gas, and after said circulating gas increase detecting step, said detection method of an airtight failure in a working-gas circulating type gas engine further includes:

a surplus gas decreasing step in which the gas, which was excessively supplied as said surplus gas in said surplus gas supplying step, in a quantity which is a predetermined quantity 3 less than the quantity needed for compensating for the decline associated with operation of the engine is supplied into said circulation passage, and thereby the quantity of the gas in said circulation passage is returned back to that before said surplus gas supplying step.

As mentioned above, in the present embodiment, the case where fuel gas or oxidizer gas is supplied as surplus gas is assumed. Moreover, in the present embodiment, after the circulating gas increase detecting step in which the circulating gas increase is detected by the gas quantity detecting means, the gas which was excessively supplied as said surplus gas in said surplus gas supplying step (fuel gas or oxidizer gas) in a quantity which is a predetermined quantity 3 less than the quantity needed for compensating for the decline associated with operation of the engine is supplied into said circulation passage. Thereby, in accordance with the present embodiment, the quantity of the surplus gas in the circulation passage can be surely decreased without taking any special measure, such as new installation of an apparatus for decreasing surplus gas excessively supplied into a circulation passage.

In addition, when there is neither leakage of the circulating gas from the circulation passage nor invasion of the open air into the circulation passage and there are no airtight failure in the circulation passage and there is no unexpected consumption of the gas excessively supplied into the circulation passage as surplus gas (fuel gas or oxidizer gas), the predetermined quantity 3 in the above-mentioned surplus gas decreasing step becomes equal to the predetermined quantity 1 in the above-mentioned surplus gas supplying step.

Moreover, the predetermined quantity 3 of the surplus gas may be decreased in one combustion cycle of the engine, or may be gradually decreased dividedly in plural combustion cycles of the engine so that the sum total of the quantities of the surplus gas decreased in the plural combustion cycles may be the predetermined quantity 3. In any case, when the quantity of the surplus gas supplied into the circulation passage decreases by the above-mentioned predetermined quantity 3, decrease of surplus gas will be stopped.

By the way, in a detection method of an airtight failure in a working-gas circulating type gas engine according to the present invention, at least one of fuel gas, oxidizer gas, and working gas in an extra predetermined quantity 1 (in addition to the quantity needed for compensating for the decline associated with operation of the engine) is supplied as surplus gas into a circulation passage by a respective gas supplying means, the quantity of gas in the circulation passage increased thereby (circulating gas increase) is detected by a gas quantity detecting means (for example, a gas pressure detecting means), and the existence of an airtight failure in the circulation passage is judged by whether the circulating gas increase corresponds to the predetermined quantity 1 or not.

As mentioned above, a detection method of an airtight failure in a working-gas circulating type gas engine according to the present invention is based on the premise that a means for supplying surplus gas supplies a precise quantity of surplus gas into a circulation passage. In the situation where a failure of some kind arises in the means for supplying surplus gas and therefore a precise quantity of surplus gas cannot be supplied into a circulation passage, it becomes difficult to attain the purpose of the present invention of detecting an airtight failure in a working-gas circulating type gas engine with sufficient accuracy. Therefore, in a detection method of an airtight failure in a working-gas circulating type gas engine according to the present invention, before judging the existence of an airtight failure in a circulation passage, it is desirable to judge the existence of a failure in the means for supplying surplus gas.

Namely, the fifth embodiment of the present invention is, a detection method of an airtight failure in a working-gas circulating type gas engine according to one of said first to fourth embodiments of the present invention, characterized in that;

said working-gas circulating type gas engine further comprises:

a surplus gas concentration detecting means to detect the surplus gas concentration which is the concentration of said surplus gas, and a supplying means failure judging means to judge the existence of a failure in said supplying means of surplus gas, and said detection method of an airtight failure in said working-gas circulating type gas engine further includes:

a surplus gas increase detecting step in which a surplus gas increase which is the increment of the quantity of the surplus gas in said circulation passage before and after said surplus gas supplying step is detected based on change of the surplus gas concentration before and after said surplus gas supplying step detected by said surplus gas concentration detecting means, and a supplying means failure judging step in which it is judged that there is a failure in said supplying means of surplus gas when the absolute value of a quantity deviation of surplus gas which is the difference between said predetermined quantity 1 and said surplus gas increase is a predetermined quantity 4 or more, while it is judged that there is no failure in said supplying means of surplus gas when the absolute value of said quantity deviation of surplus gas is less than said predetermined quantity 4.

The above-mentioned surplus gas concentration detecting means is not limited to a specific composition, as long as it can detect the concentration of surplus gas in a circulation passage. For example, the above-mentioned surplus gas concentration detecting means may be what is called a "gas concentration sensor" that sends out the signal corresponding to the concentration of the gas which exists around a sensor element as current or voltage. In the art, as such gas concentration sensors, in accordance with the properties etc.

of the gas whose concentration is going to be detected, those with various configurations have been developed. Therefore, also in the present embodiment, a suitable gas concentration sensor can be suitably chosen in accordance with the gas supplies as surplus gas.

For example, when hydrogen which is fuel gas is supplied as surplus gas, a hydrogen concentration sensor is chosen as a surplus gas concentration detecting means. As a hydrogen concentration sensor, for example, those of a contact combustion type and a semiconductor type can be used. Moreover, when oxygen which is oxidizer gas is supplied as surplus gas, an oxygen concentration sensor is chosen as a surplus gas concentration detecting means. In general, an oxygen concentration sensor detects the oxygen concentration around the sensor using the oxygen ion conductivity of the stabilized zirconia (ceramics) heated at high temperature. These surplus gas concentration detecting means may be configured so that the measurement signal (detection signal) corresponding to the concentration of the detected surplus gas may be sent out.

Moreover, the above-mentioned surplus gas concentration detecting means is not site-specific, as long as it can detect the concentration of the surplus gas in a circulation passage. In addition, in an engine which is an internal-combustion engine, for example, an oxygen concentration sensor is often disposed around the downstream of the exhaust manifold of the engine for the purpose of air-fuel ratio control etc. Therefore, in an embodiment where oxygen is adopted as surplus gas and such an existing oxygen concentration sensor is used as a surplus gas concentration detecting means in a detection method of an airtight failure in a working-gas circulating type gas engine according to the present invention, since a new component is not needed to be added, it is desirable also from a viewpoint of not promoting enlargement, complication, and high cost of the system containing an engine to which a detection method of an airtight failure in a working-gas circulating type gas engine according to the present embodiment is applied.

In the present embodiment, the above-mentioned supplying means failure judging means judges the existence of a failure in the supplying means of surplus gas. Specifically, first, in a surplus gas increase detecting step, based on change of the surplus gas concentration before and after a surplus gas supplying step detected by a surplus gas concentration detecting means, the surplus gas increase which is the increment of the quantity of the surplus gas in the above-mentioned circulation passage before and after the surplus gas supplying step is detected. Namely, this surplus gas increase means how much the quantity of surplus gas is actually increased by the surplus gas supplying means in the surplus gas supplying step.

Next, in a supplying means failure judging step, the absolute value of the surplus gas quantity deviation which is the difference of the predetermined quantity 1 and the above-mentioned surplus gas increase is calculated. As mentioned above, the predetermined quantity 1 is the quantity of the surplus gas which must have been supplied into the circulation passage by the supplying means into the circulation passage as surplus gas in the surplus gas supplying step (quantity increased due to the extra supply). Namely, the absolute value of this surplus gas quantity deviation is the absolute value of the difference between the quantity of the surplus gas which must have been increased by the supplying means in the surplus gas supplying step and the increase of the surplus gas detected by the surplus gas concentration detecting means in the surplus gas increase detecting step.

Therefore, when there is no failure in the supplying means of surplus gas and the supplying means of surplus gas supplies a precise quantity of surplus gas into the circulation passage, the absolute value of a quantity deviation of surplus gas will be zero or a very small value. On the other hand, when the supplying means of surplus gas has a failure and the supplying means of surplus gas does not supply a precise quantity of surplus gas into the circulation passage, the absolute value of a quantity deviation of surplus gas will not be zero, but a value according to the grade of the failure in the supplying means of surplus gas.

Then, in the supplying means failure judging step, it is judged that there is a failure in the supplying means of surplus gas when the absolute value of a quantity deviation of surplus gas which is the difference between said predetermined quantity 1 and said surplus gas increase is a predetermined quantity 4 or more, while it is judged that there is no failure in said supplying means of surplus gas when the absolute value of said quantity deviation of surplus gas is less than said predetermined quantity 4.

Here, the above-mentioned predetermined quantity 4 is a threshold value for judging the existence of a failure in the supplying means of surplus gas based on the absolute value of the above-mentioned quantity deviation of surplus gas. In other words, it can be said that the above-mentioned predetermined quantity 4 is the maximum acceptable value of the difference between the quantity of the surplus gas which must have been increased by the supplying means in the surplus gas supplying step and the increase of the surplus gas detected by the surplus gas concentration detecting means in the surplus gas increase detecting step. In addition, the predetermined quantity 4 can be suitably set, taking into consideration, for example, the accuracy of supply quantity control of the supplying means of the gas supplied as surplus gas, the detection accuracy of the gas concentration detecting means, etc.

As mentioned above, in accordance with the present embodiment, it is verified whether the supplying means of surplus gas was operated normally in the surplus gas supplying step to increase the gas supplied into the circulation passage as surplus gas by the predetermined quantity 1. Therefore, in accordance with the present embodiment, since the normal operation of the supplying means of surplus gas which is the prerequisite for judging the existence of an airtight failure in a working-gas circulating type gas engine can be checked, the reliability of a detection method of an airtight failure in a working-gas circulating type gas engine according to the present invention can be further improved.

As mentioned above, although some embodiments of a detection method of an airtight failure in a working-gas circulating type gas engine according to the present invention have been explained, the scope of the present invention is not limited to these methods and a working-gas circulating type gas engine to which these methods are applied is also contained in the scope of the present invention. Since the details of such a working-gas circulating type gas engine is clear from the explanation about the detection methods of an airtight failure in a working-gas circulating type gas engine according to respective embodiments which have been explained so far, it will not be explained anew here, but only the constituent features of each working-gas circulating type gas engine will be listed below.

Namely, the sixth embodiment of the present invention is, a working-gas circulating type gas engine, which leads fuel gas, oxidizer gas, and working gas to a combustion chamber and burns said fuel gas in the combustion chamber to obtain motive power and comprises:

a fuel gas supplying means to supply said fuel gas, an oxidizer gas supplying means to supply said oxidizer gas, a working-gas supplying means to supply said working gas, a sealed circulation passage which circulates burnt gas emitted from an exhaust port which communicate to said combustion chamber to an intake port which communicates to said combustion chamber circulate therethrough, and a combustion product removing means to separate and remove combustion product produced by combustion of said fuel gas from said burnt gas, characterized in that;

said working-gas circulating type gas engine further comprises:

a gas quantity detecting means to detect gas quantity in said circulation passage, and an airtightness judging means to judge the airtightness of said circulation passage, and in said working-gas circulating type gas engine:

at least one of said fuel gas supplying means, said oxidizer gas supplying means, and said working-gas supplying means supplies at least one of said fuel gas, said oxidizer gas, and said working gas in an extra predetermined quantity 1 in addition to the quantity needed for compensating for the decline associated with operation of the engine as surplus gas into said circulation passage, said gas quantity detecting means detects a circulating gas increase which is an increment of the quantity of gas in said circulation passage before and after said surplus gas supplying step, and said airtightness judging means judges that there is an airtight failure in said working-gas circulating type gas engine when the absolute value of a quantity deviation of circulation gas which is the difference between said predetermined quantity 1 and said circulating gas increase is a predetermined quantity 2 or more, while it judges that there is no airtight failure in said working-gas circulating type gas engine when the absolute values of said quantity deviation of circulation gas is less than said predetermined quantity 2.

Moreover, the seventh embodiment of the present invention is, a working-gas circulating type gas engine according to said sixth embodiment of the present invention, characterized in that;

said fuel gas, oxidizer gas, and working gas are hydrogen, oxygen, and argon, respectively.

Furthermore, the eighth embodiment of the present invention is, a working-gas circulating type gas engine according to one of said sixth or seventh embodiment of the present invention, characterized in that;

said gas quantity detecting means is a gas pressure detecting means to detect the pressure of the gas in said circulation passage.

Furthermore, the ninth embodiment of the present invention is, a working-gas circulating type gas engine according to one of said sixth to eighth embodiments of the present invention, characterized in that;

said surplus gas is in any of said fuel gas or said oxidizer gas, and in said working-gas circulating type gas engine, after said gas quantity detecting means detects said circulating gas increase, said supplying means of surplus gas supplies the gas, which was excessively supplied as said surplus gas by said supplying means of surplus gas, in a quantity which is a predetermined quantity 3 less than the quantity needed for compensating for the decline associated with operation of the engine into said circulation passage, and thereby returns the quantity of the gas in said circulation passage back to that before said surplus gas was excessively supplied.

Next, the tenth embodiment of the present invention is, a working-gas circulating type gas engine according to one of said sixth to ninth embodiments of the present invention, characterized in that;

said working-gas circulating type gas engine further comprises:

a surplus gas concentration detecting means to detect the surplus gas concentration which is the concentration of said surplus gas, and a supplying means failure judging means to judge the existence of a failure in said supplying means of surplus gas, and in said working-gas circulating type gas engine, a surplus gas increase which is the increment of the quantity of the surplus gas in said circulation passage before and after said surplus gas was excessively supplied is detected based on change of the surplus gas concentration before and after said surplus gas was excessively supplied detected by said surplus gas concentration detecting means, and a supplying means failure judging means judges that there is a failure in said supplying means of surplus gas when the absolute value of a quantity deviation of surplus gas which is the difference between said predetermined quantity 1 and said surplus gas increase is a predetermined quantity 4 or more, while it judges that there is no failure in said supplying means of surplus gas when the absolute value of said quantity deviation of surplus gas is less than said predetermined quantity 4.

As mentioned above, in accordance with a working-gas circulating type gas engine to which a detection method of an airtight failure in a working-gas circulating type gas engine according to any of various embodiments of the present invention is applied, at least one of fuel gas, oxidizer gas, and working gas in an extra predetermined quantity 1 (in addition to the quantity needed for compensating for the decline associated with operation of the engine) is supplied as surplus gas into a circulation passage, the quantity of gas in the circulation passage increased thereby (circulating gas increase) is detected by a gas quantity detecting means (for example, a gas pressure detecting means), and the existence of an airtight failure in the circulation passage is judged by whether the circulating gas increase corresponds to the predetermined quantity 1 or not (whether the absolute value of a quantity deviation of circulation gas which is the difference between them is less than a predetermined quantity 2 or not). As a result, in accordance with the present invention, the existence of an airtight failure in the circulation passage of the working-gas circulating type gas engine can be judged with high accuracy.

Hereafter, referring to an accompanying drawing etc., detection methods of an airtight failure in a working-gas circulating type gas engine and working-gas circulating type gas engines to which the methods are applied according to some embodiments of the present invention will be explained. However, the explanation which will be mentioned below is provided only for the purpose of exemplification, and the scope of the present invention should not be interpreted as to be limited to the following explanation.

Example

Figure 3:
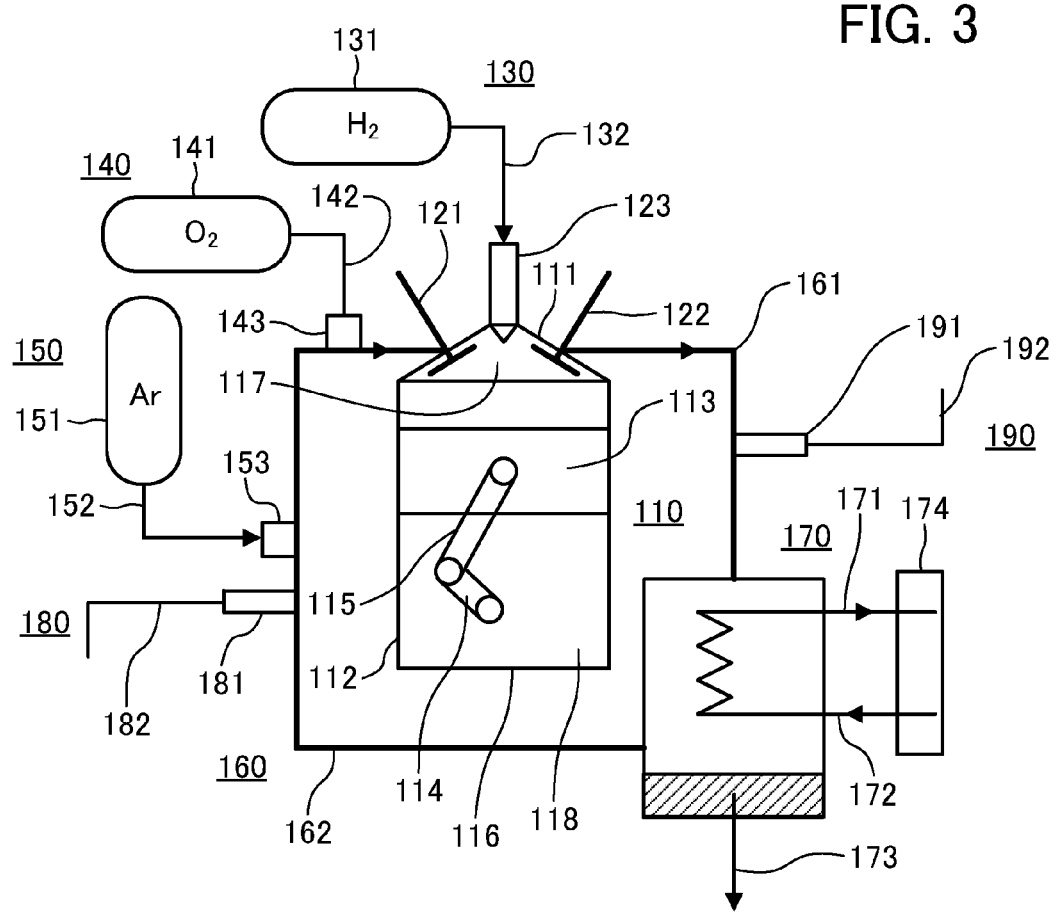
FIG. 3 A schematic view showing the configuration of a system containing a working-gas circulating type gas engine to which a detection method of an airtight failure in a working-gas circulating type gas engine according to one embodiment of the present invention is applied.

1) Configuration of System Containing Working-Gas Circulating Type Gas Engine As mentioned above, FIG. 3 is a schematic view showing the configuration of a system containing a working-gas circulating type gas engine to which a detection method of an airtight failure in a working-gas circulating type gas engine according to one embodiment of the present invention is applied. The system is equipped with a main part 110, a fuel gas supplying means 130, an oxidizer gas supplying means 140, a working gas supplying means 150, a circulation passage 160, and a combustion product removing means 170 of the working-gas circulating type gas engine. As shown in FIG. 3, this engine is a type of an engine in which diffuse combustion of fuel gas is carried out by supplying oxygen as oxidizer gas and argon as working gas into a combustion chamber, compressing the gas to a high temperature and high pressure state, and injecting hydrogen as fuel gas into the gas. Although FIG. 3 shows only the cross section of a specific cylinder of the main part 110 of the engine, in the case of an engine containing two or more cylinders, other cylinders also have a similar configuration.

Although the main part 110 of the engine is not limited to a specific configuration, in the present embodiment, it is a piston reciprocation type engine equipped with a cylinder head 111, a cylinder 112 formed by a cylinder block, a piston 113 which moves reciprocately in the cylinder, a crankshaft 114, a connecting rod 115 for connecting the piston 113 with the crankshaft 114 and converting reciprocating movement of the piston 113 into rotational movement of the crankshaft 114, and an oil pan 116 connected with the cylinder block.

In this case, a piston ring (not shown) is disposed on the side surface of the piston 113, and space, which is formed by the cylinder head 111, the cylinder 112, and the oil pan 116, is divided with the piston 113, into a combustion chamber 117 on the side of the top surface of the piston and a crankcase 118 which houses the crankshaft.

An intake port communicated to the combustion chamber 117 and the exhaust port communicated to the combustion chamber 117 (shown neither) are formed in the cylinder head 111. An intake valve 121 which opens and closes the intake port is disposed in the intake port, and an exhaust valve 122 which opens and closes the exhaust port is disposed in the exhaust port. Furthermore, a fuel injection valve 123 which carries out direct injection of hydrogen gas as fuel into the combustion chamber 117 is disposed in the cylinder head.

The fuel gas supplying means 130 can be equipped with a fuel gas storage tank 131 (hydrogen tank), a fuel gas passage 132, a fuel gas pressure regulator (not shown), a fuel gas flowmeter (not shown), and a surge tank (not shown), etc. Moreover, the oxidizer gas supplying means 140 can be equipped with an oxidizer gas storage tank 141 (oxygen tank), an oxidizer gas passage 142, an oxidizer gas pressure regulator (not shown), an oxidizer gas flowmeter (not shown), and an oxidizer gas mixer (not shown). Furthermore, the working gas supplying means 140 can be equipped with a working gas storage tank 141 (argon tank), a working gas passage 142, a working gas pressure regulator (not shown), a working gas flowmeter (not shown), and a working gas mixer (not shown).

In addition, about the specific configurations and operations of the main part 110 of the engine, the fuel supplying means 130, the oxidizer supplying means 140, and the working gas supplying means 150, since they are well known, for example, in the art regarding a working-gas circulating type gas engine etc., the detailed explanations thereof in this specification is omitted.

The circulation passage 160 is equipped with first and second passage parts (first and second channels forming pipes) 161 and 162, and a combustion product removing means 170 (condensation machine) having an entrance part and an exit part is interposed between the first passage part 161 and the second passage part 162. The circulation passage 160 constitutes the "circulation passage of burnt gas (circulation gas)" which connects the exhaust port and the intake port in the exterior of the combustion chamber 117.

The first passage part 161 connects the exhaust port and the entrance part of the combustion product removing means 170. The second passage part 162 connects the exit part of the combustion product removing means 170 and the inlet port, and in the middle thereof the oxidizer gas supplying means 140 and the working gas supplying means 150 join through the oxidizer gas mixer, and the working gas mixer (shown neither), etc.

As mentioned above, in a detection method of an airtight failure in a working-gas circulating type gas engine according to the present invention, at least one of fuel gas, oxidizer gas, and working gas in an extra predetermined quantity 1 in addition to the quantity needed for compensating for the decline associated with operation of the engine is supplied as surplus gas into a circulation passage. This surplus gas supplying step can be carried out by controlling at least one of the above-mentioned fuel gas supplying means 130, oxidizer gas supplying means 140, and working gas supplying means 150, for example, based on a program stored in memory storage (for example, ROM) with which ECU is equipped. In addition, in the present embodiment, by using the oxidizer gas supplying means 140, an extra predetermined quantity 1 of oxidizer gas (in the present embodiment, oxygen) is supplied as surplus gas into the circulation passage.

In the present embodiment, the combustion product removing means 170 is a condensation machine for removing the water ($H_2O$), which is the combustion product when burning hydrogen as fuel gas, from a burnt gas. The combustion product removing means 170 (condensation machine) is equipped with the entrance part and the exit part of burnt gas (circulating gas) as mentioned above. Furthermore, the combustion product removing means 170 is equipped with a coolant inlet port 171, a coolant outlet port 172, and a condensed water outlet port 173, and a heat radiator (radiator) 174 used for cooling coolant is interposed in a coolant circulation part which connects the coolant inlet port 171 and the coolant outlet port 172. In addition, as coolant, for example, water can be used.

The combustion product removing means 170 cools and condenses water vapor ($H_2O$) contained in the burnt gas (circulating gas) which is introduced from the entrance part and discharged from the exit part with the coolant which is introduced from the coolant inlet port 171 and, after passing through the inside of the combustion product removing means 170, discharged from the coolant outlet port 172. The condensed water once collects on the bottom of the combustion product removing means 170, and then is discharged out of the system through the condensed water outlet port 173 when a valve object (not shown) which opens and closes the condensed water outlet port 173 is opened. Namely, in the present embodiment, the bottom of the combustion product removing means 170 serves the function of the condensed water reservoir, and the condensed water outlet port 173 and the above-mentioned valve object constitute the means of water disposal. On the other hand, the gas from which water vapor (H₂O) as a combustion product was removed (separated) is discharged to the circulation passage 160 (second passage part 162) from the exit part of the combustion product removing means 170.

In addition, as mentioned above, although a water-cooling condensation machine which can use cooling water as coolant is used as the combustion product removing means 170 in the present embodiment, the combustion product removing means 170 may be a condensation machine which uses coolants other than water, and may be equipped with an air-cooling condensation part which condenses the moisture in the gas passing through the inside thereof with air (ventilation of air). Moreover, it is needless to say that the system should be equipped with a combustion product removing means 170 appropriate to a combustion product which is generated when using fuel gas which generates a combustion product other than water (H₂O), until it says it.

Next, in the present embodiment, the gas quantity detecting means 180 (in this embodiment, a gas pressure detecting means) is disposed in the circulation passage 160 (second passage part 162) upstream rather than the above-mentioned oxidizer gas supplying means 140 and the working gas supplying means 150. The gas quantity detecting means 180 is equipped with a gas quantity sensor 181 which detects the pressure of the circulating gas in the circulation passage 160 and a gas quantity detection signal sending-out line 182 which sends out the measurement signal (detection signal) corresponding to the pressure of the circulating gas detected by the gas quantity sensor 181.

For example, the measurement signal (detection signal) corresponding to the pressure of the circulating gas detected by the gas quantity sensor 181 which the gas quantity detecting means 180 comprises, as mentioned above, is provided for ECU (not shown) through the gas quantity detection signal sending-out line 182 and used for making CPU, which the ECU comprises, perform the processing in which a circulating gas increase which is the increment of the quantity of the gas in the circulation passage 160 before and behind the surplus gas supplying step is detected in the circulating gas increase detecting step, and it is judged that there is an airtight failure in the working-gas circulating type gas engine when the absolute value of a quantity deviation of circulation gas which is the difference between the above-mentioned predetermined quantity 1 and the circulating gas increase is a predetermined threshold (predetermined quantity 2) or more, while it is judged that there is no airtight failure in the working-gas circulating type gas engine when the absolute values of the quantity deviation of circulation gas is less than the predetermined quantity 2 in the airtightness judging step, based on a program stored in the memory storage (for example, ROM) which the ECU comprises.

Next, in the present embodiment, a surplus gas concentration detecting means 190 (in the present embodiment, an oxygen gas concentration sensor) is disposed in the circulation passage 160 (first passage part 161) upstream rather than the above-mentioned combustion product removing means 170. The surplus gas concentration detecting means 190 is equipped with a surplus gas concentration sensor 191 which detects the concentration of the surplus gas in the first passage part 161 and a surplus gas concentration detection signal sending-out line 192 which sends out the measurement signal (detection signal) corresponding to the concentration of the surplus gas detected by the surplus gas concentration sensor 191.

For example, the measurement signal (detection signal) corresponding to the concentration of the surplus gas detected by the surplus gas concentration sensor 191 which the surplus gas concentration detecting means 190 comprises, as mentioned above, is provided for ECU (not shown) through the surplus gas concentration detection signal sending-out line 192 and used for making CPU which the ECU comprises perform the processing in which a surplus gas increase which is the increment of the quantity of the surplus gas in the circulation passage 160 before and after the surplus gas supplying step is calculated based on change of the surplus gas concentration before and after the surplus gas supplying step detected by the surplus gas concentration detecting means 190 in the surplus gas increase detecting step, and it is judged that there is a failure in the supplying means of surplus gas when the absolute value of a quantity deviation of surplus gas which is the difference between the above-mentioned predetermined quantity 1 and the surplus gas increase is a predetermined threshold (predetermined quantity 4) or more, while it is judged that there is no failure in the supplying means of surplus gas when the absolute value of the quantity deviation of surplus gas is less than the predetermined quantity 4 in a supplying means failure judging step, based on a program stored in the memory storage (for example, ROM) which the ECU comprises.

In the present embodiment, as mentioned above, oxidizer gas (in the present embodiment, oxygen) in an extra predetermined quantity 1 in addition to the quantity needed for compensating for the decline associated with operation of the engine is supplied as surplus gas into the circulation passage 160 by the oxidizer gas supplying means 140 in a surplus gas supplying step, a circulating gas increase which is an increment of the quantity of gas in the circulation passage 160 before and after the surplus gas supplying step is detected by the gas quantity detecting means 180 (in the present embodiment, a gas pressure detecting means) in a circulating gas increase detecting step, and it is judged that there is an airtight failure in the working-gas circulating type gas engine when the absolute value of a quantity deviation of circulation gas which is the difference between the predetermined quantity 1 and the circulating gas increase is a predetermined quantity 2 or more, while it is judged that there is no airtight failure in the working-gas circulating type gas engine when the absolute values of the quantity deviation of circulation gas is less than the predetermined quantity 2, in an airtightness judging step. Thereby, in accordance with the present embodiment, the existence of an airtight failure in the circulation passage of the working-gas circulating type gas engine can be judged with high accuracy.

Moreover, in the present embodiment, as mentioned above, a surplus gas increase which is the increment of the quantity of the surplus gas in the circulation passage 160 before and after the surplus gas supplying step is detected based on change of the concentration of surplus gas (in the present embodiment, oxygen) before and after the surplus gas supplying step detected by the surplus gas concentration detecting means 190 (in the present embodiment, an oxygen concentration detecting means) in a surplus gas increase detecting step, and it is judged that there is a failure in the supplying means of surplus gas when the absolute value of a quantity deviation of surplus gas which is the difference between the predetermined quantity 1 and the surplus gas increase is a predetermined quantity 4 or more, while it is judged that there is no failure in the supplying means of surplus gas when the absolute value of the quantity deviation of surplus gas is less than the predetermined quantity 4 in a supplying means failure judging step. Thereby, in accordance with the present embodiment, since the normal operation of the supplying means of surplus gas which is the prerequisite for judging the existence of an airtight failure in a working-gas circulating type gas engine can be checked, the reliability of a detection method of an airtight failure in a working-gas circulating type gas engine according to the present invention can be further improved.

Referring to drawings, a series of processing performed in such a detection method of an airtight failure in a working-gas circulating type gas engine will be explained in detail below.

2) Specific example of detection method of airtight failure in working-gas circulating type gas engine (1)

As mentioned above, in accordance with a detection method of an airtight failure in a working-gas circulating type gas engine according to the present invention, the airtight failure in the working-gas circulating type gas engine can be detected with sufficient accuracy by supplying as surplus gas at least one of fuel gas, oxidizer gas, and working gas in an extra predetermined quantity 1 into a circulation passage, and judging the existence of an airtight failure in the working-gas circulating type gas engine based on the absolute values of the difference (quantity deviation of circulation gas) between the quantity of the surplus gas which must have been thus supplied into the circulation passage (predetermined quantity 1) and the increment of the quantity of the gas in the circulation passage separately detected by a gas quantity detecting means (circulating gas increase). Moreover, based on the judgment result thus obtained, various actions (for example, emitting warning, etc.) can be also controlled.

Here, such a series of processing will be explained referring to FIG. 4. As mentioned above, FIG. 4 is a flow chart showing a series of processing performed in a detection method of an airtight failure in a working-gas circulating type gas engine according to one embodiment of the present invention. The series of processing shown in the flow chart can be performed by ECU (not shown) as interruption processing, for example, for every predetermined crank angle.

Figure 4:
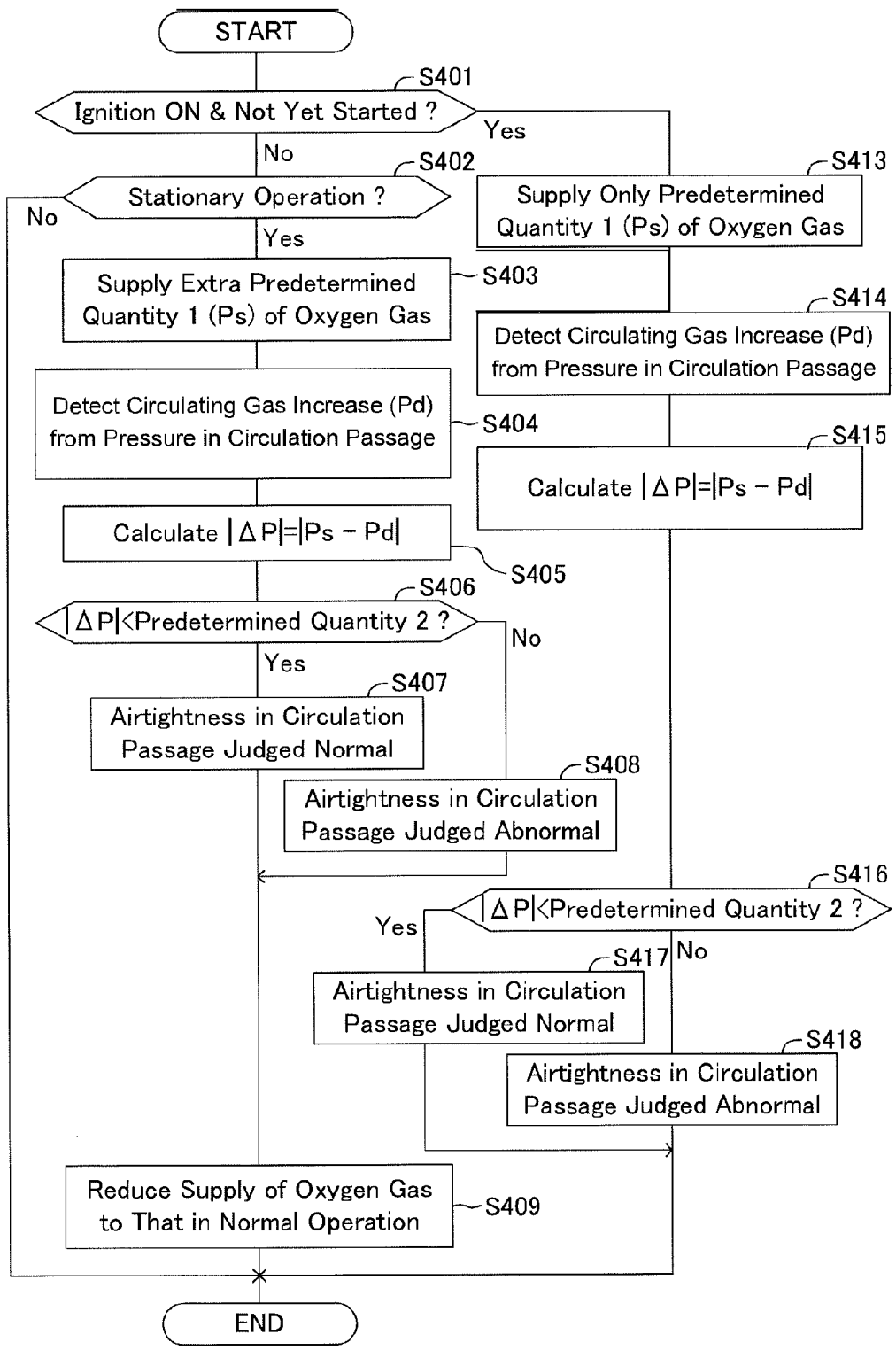
FIG. 4 A flow chart showing a series of processing performed in a detection method of an airtight failure in a working-gas circulating type gas engine according to one embodiment of the present invention.

As shown in FIG. 4, in the present embodiment, first in step S401, it is judged whether it is in the state where the ignition switch is set to ON in the working-gas circulating type gas engine and the engine has not yet been started, or not. In addition, the step is not an indispensable component in a detection method of an airtight failure in a working-gas circulating type gas engine according to the present invention, and it is disclosed as one modification in the present embodiment exemplified as one working example.

In the above-mentioned step S401, when it is judged to be in the state where the ignition switch is set to ON and the engine has not yet been started (step S401: Yes), a series of processing in step S413 or after is performed. As for the series of processing, it will be mentioned later separately.

On the other hand, when the engine has already been started (step S401: No), it is judged whether the operational status of the working-gas circulating type gas engine is in a stationary state or not (step S402). Here, as conditions for judging whether the operational status of the engine is in a stationary state or not, for example, conditions, such as whether the engine concerned is in an idling state or not, whether the amount of change of an accelerator is below a predetermined value or not, can be exemplified. In addition, the step is not an indispensable component in a detection method of an airtight failure in a working-gas circulating type gas engine according to the present invention, either, and it is disclosed as one modification in the present embodiment exemplified as one working example, too.

When the operational status of the working-gas circulating type gas engine is judged not to be in a stationary state in the above-mentioned step S402 (step S402: No), the change of the quantity of fuel gas and oxidizer gas consumed in the combustion cycle of the engine is large, and the pressure of the gas in the circulation passage and the concentration of these gases change largely. Therefore, since it is difficult to judge the existence of an airtight failure in the engine in such a state, in the present embodiment, as shown in FIG. 4, the operational status of the working-gas circulating type gas engine is not in a stationary state in the above-mentioned step S402 (step S402: No), the series of processing to be performed in accordance with the flow chart shown in FIG. 4 is ended.

On the other hand, when the operational status of the working-gas circulating type gas engine is judged to be in a stationary state in the above-mentioned step S402 (step S402: Yes), in the present working example, as a surplus gas supplying step, oxygen gas which is oxidizer gas in an extra predetermined quantity 1 (Ps) in addition to the quantity needed for compensating for the decline associated with operation of the engine is supplied as surplus gas into the circulation passage (step S403). Here, the predetermined quantity 1 (Ps) can be set, taking into consideration the accuracy of supply quantity control of the supplying means of the oxygen gas supplied as surplus gas, the detection accuracy of the gas quantity detecting means, etc., as mentioned above.

Next, in the circulating gas increase detecting step, a gas quantity detecting means (in the present embodiment, a gas pressure detecting means) detects the circulating gas increase (Pd) which is the increment of the quantity of the gas in the circulation passage before and after the above-mentioned surplus gas supplying step (step S404). Furthermore, the absolute value ($|\Delta P|$) of the quantity deviation of circulating gas ($\Delta P$) which is the difference of the predetermined quantity 1 (Ps) and the circulating gas increase (Pd) is calculated in step S405, and it is judged whether the absolute value ($|\Delta P|$) of the quantity deviation of circulating gas $\Delta P$ is less than a predetermined quantity 2 or not in step S406.

Here, the above-mentioned predetermined quantity 2 is a threshold value for judging the existence of an airtight failure in a working-gas circulating type gas engine based on the absolute value ($|\Delta P|$) of quantity deviation of circulating gas $\Delta P$ as mentioned above. In other words, it can be said that the above-mentioned predetermined quantity 2 is the maximum acceptable value of a difference between the quantity of the surplus gas (in the present embodiment, oxygen) (Ps) which must have been supplied by the oxidizer gas supplying means into the circulation passage as surplus gas and the increment of the quantity of the gas in the circulation passage (circulating gas increase Pd) actually detected by a gas quantity detecting means (in this embodiment, a gas pressure detecting means). As mentioned above, the predetermined quantity 2 can be suitably set, taking into consideration, for example, the accuracy of supply quantity control of the supplying means of the gas supplied as surplus gas, the detection accuracy of a gas quantity detecting means, etc.

When the absolute value ($|\Delta P|$) of quantity deviation of circulating gas $\Delta P$ is judged to be less than the predetermined quantity 2 in the above-mentioned step S406 (step S406:Yes), it is judged that there is no airtight failure in the engine, namely, it is judged that the airtightness of the circulation passage of the engine is normal (step S407). On the other hand, when the absolute values ($|\Delta P|$) of quantity deviation of circulating gas ΔP is judged to be the predetermined quantity 2 or more in the above-mentioned step S406 (step S406: No), it is judged that there is an airtight failure in the engine, namely, it is judged that the airtightness of the circulation passage of the engine is abnormal (step S408). Namely, step S405 to step S408 correspond to the above-mentioned airtightness judging step.

Then, in the present embodiment, similarly to the above-mentioned fourth embodiment of the present invention, a surplus gas decreasing step in which oxygen gas which was excessively supplied as surplus gas into the circulation passage in the surplus gas supplying step (in the present embodiment, step S403) in a quantity which is a predetermined quantity 3 less than the quantity needed for compensating for the decline associated with operation of the engine is supplied into the circulation passage and thereby the quantity of oxygen gas in the circulation passage is decreased to that during normal operation before the surplus gas supplying step is performed (step S409).

Here, the transition of the quantity of the circulating gas (gas pressure) in the circulation passage observed when the quantity of oxygen gas supplied into the circulation passage is reduced after oxygen gas is excessively supplied into the circulation passage and the existence of an airtight failure in the circulation passage is judged as mentioned above will be explained referring to FIG. 5. As mentioned above, FIG. 5 is a graph showing transitions of the quantity of circulating gas in a circulation passage observed when surplus gas is supplied into the circulation passage, the airtightness is judged, and thereafter the quantity of the gas supplied as surplus gas is reduced.

Figure 5:
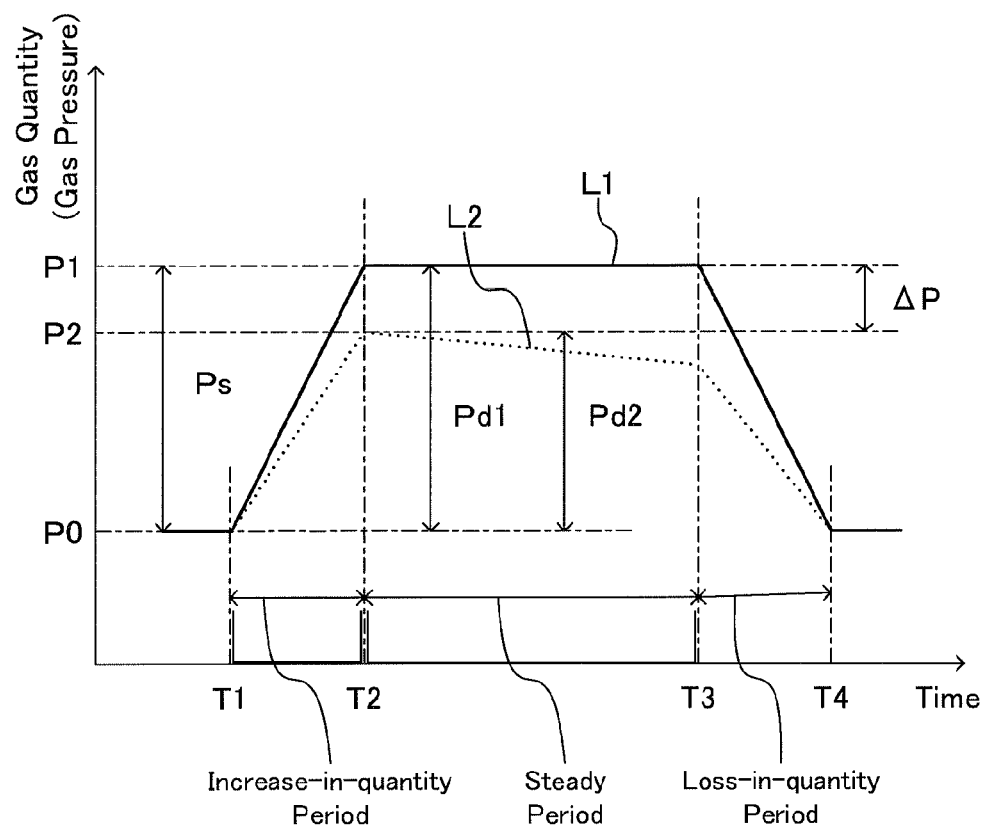
FIG. 5 A graph showing transitions of the quantity of circulating gas in a circulation passage observed when surplus gas is supplied into the circulation passage, the airtightness is judged, and thereafter the quantity of the gas supplied as surplus gas is reduced.

In the graph shown in FIG. 5, its vertical axis expresses gas quantity (in the present embodiment, gas pressure) in a circulation passage, and its horizontal axis expresses time. Moreover, in the graph, the line L1 (solid line) shows the transition of the gas quantity as mentioned above when the airtightness is normal, and the line L2 (dotted line) shows the same when the airtightness is abnormal. First, referring to the line L1 (solid line), the transition of the gas quantity in the circulation passage when the airtightness is normal will be explained. In the normal operational status of the engine, since fuel gas and oxidizer gas in a quantity needed for compensating for the decline associated with operation of the engine is supplied, the gas quantity in the circulation passage is stable at P0.

At the time T1, supply of surplus gas (in the present embodiment, oxygen) is started, and the above-mentioned extra predetermined quantity 1 (indicated by "Ps" in the figure) of oxygen is supplied into the circulation passage for the period until the time T2 (in FIG. 5, displayed as an "increase-in-quantity period"). As a result, in the line L1, the gas quantity rises from P0 to P1. This quantity rise (P1–P0) corresponds to the above-mentioned circulating gas increase (indicated by "Pd1" in the figure). Thus, when airtightness is normal, as shown by the line L1, the predetermined quantity 1 (Ps) which is the supply quantity of surplus gas and the increase (Pd1) of the circulating gas in the circulation passage detected by the gas quantity detecting means correspond with each other (or the absolute value (|ΔP|) of the quantity deviation of circulating gas (ΔP) which is the difference between these is small). Thereby, it can be checked that the airtightness in the circulation passage of the engine is maintained normal.

As shown line L1, in the present embodiment, thereafter, the gas quantity in the circulation passage has been maintained P1 to the time T3 (in FIG. 5, displayed as a "stationary period"). Namely, during this period, surplus gas is not supplied, but fuel gas and oxidizer gas in the quantity needed for compensating for the decline associated with operation of the engine are supplied. In the graph shown in FIG. 5, thereafter, at the time T3, the supply quantity of oxygen gas is reduced to the quantity which is (the predetermined quantity 3) less than the quantity needed for compensating for the decline associated with operation of the engine. As a result, the gas quantity in the circulation passage begins to fall from P1, and returns back to P0 which is the gas quantity in the circulation passage in the normal operational status of the engine at the time T4 (in FIG. 5, displayed as a "loss-in-quantity period").

Next, referring to the line L2 (dotted line), the transition of the gas quantity in the circulation passage when airtightness is abnormal. Also in this case, in the normal operational status of the engine, since fuel gas and oxidizer gas in a quantity needed for compensating for the decline associated with operation of the engine (in this case, including leakage due to airtight failure, strictly) is supplied, the gas quantity in the circulation passage is stable at P0.

At the time T1, supply of surplus gas (in the present embodiment, oxygen) is started, and the above-mentioned extra predetermined quantity 1 (indicated by "Ps" in the figure) of oxygen is supplied into the circulation passage for the period until the time T2 (increase-in-quantity period). However, in the line L2, since the air tightness in the circulation passage is insufficient, the gas quantity rises from P0 only to P1. This quantity rise (P2–P0) corresponds to the above-mentioned circulating gas increase (indicated by "Pd2" in the figure). Thus, when airtightness is abnormal, as shown by the line L2, the predetermined quantity 1 (Ps) which is the supply quantity of surplus gas and the increase (Pd2) of the circulating gas in the circulation passage detected by the gas quantity detecting means do not correspond with each other (or the absolute value (|ΔP|) of the quantity deviation of circulating gas (ΔP) which is the difference between these is large). In the present embodiment, it can be accurately judged whether the airtightness of the circulation passage of the engine is normal or not based on whether the absolute value (|ΔP|) of this quantity deviation of circulating gas (ΔP) is less than the above-mentioned predetermined quantity 2 as a threshold value.

As shown by the line L2, in the present embodiment, thereafter, the gas quantity in the circulation passage is descending gradually from P2 to the time T3 (stationary period). In the present embodiment, during this period, surplus gas is not supplied, but fuel gas and oxidizer gas in the quantity needed for compensating for the decline associated with operation of the engine are supplied. Therefore, under normal circumstances, similarly to the line L1, the gas quantity in the circulation passage during this period should have been maintained constant. However, in the line L2 in the graph shown in FIG. 5, since the airtightness in the circulation passage is insufficient, the gas quantity in the circulation passage cannot be maintained constant also during this period. Thereafter, at the time T3, the supply quantity of oxygen gas is reduced to the quantity which is less than the quantity needed for compensating for the decline associated with operation of the engine. As a result, the gas quantity in the circulation passage begins to fall from P2, and returns back to P0 which is the gas quantity in the circulation passage in the normal operational status of the engine at the time T4 (loss-in-quantity period).

As mentioned above, as explained in detail referring to FIG. 5, in accordance with the present embodiment, in a working-gas circulating type gas engine being operated in a stationary state, oxygen gas in an extra predetermined quantity 1 (Ps) in addition to the quantity needed for compensating for the decline associated with operation of the engine is supplied as surplus gas into a circulation passage, the circulating gas increase (Pd) which is the increment of the quantity of the gas in the circulation passage corresponding thereto is detected by a gas pressure detecting means, and the existence of an airtight failure in the circulation passage of the engine can be judged with high accuracy based on whether the absolute value (|ΔP|) of the quantity deviation of circulating gas (ΔP) which is the difference of the predetermined quantity 1 (Ps) and the circulating gas increase (Pd) is less than a predetermined quantity 2 or not.

Furthermore, in the present embodiment, after the above-mentioned judgment, oxygen gas, which was excessively supplied as surplus gas into the circulation passage, in a quantity which is a predetermined quantity 3 less than the quantity needed for compensating for the decline associated with operation of the engine is supplied into the circulation passage and thereby the quantity of oxygen gas in the circulation passage can be returned back to that during normal operation before the surplus gas supplying step without taking any special measure, such as new installation of an apparatus for decreasing surplus gas.

In addition, in the present embodiment, although how to detect the existence of an airtight failure in the circulation passage of a working-gas circulating type gas engine during the stationary period shown in FIG. 5 has been explained, a detection method of an airtight failure in a working-gas circulating type gas engine according to the present invention is not limited to such an embodiment. Specifically, in a detection method of an airtight failure in a working-gas circulating type gas engine according to the present invention, the existence of an airtight failure in the circulation passage of a working-gas circulating type gas engine may be detected during a period other than the stationary period shown in FIG. 5 (that is, an increase-in-quantity period or loss-in-quantity period).

By the way, in the present embodiment, as mentioned above, when it is judged to be in the state where the ignition switch is set to ON and the engine has not yet been started (step S401: Yes), a series of processing in step S413 or after is performed. As for the series of processing In this case, since the engine has not yet been started, the "decline associated with operation of the engine" at the time of supplying an extra predetermined quantity 1 (Ps) of oxygen gas in addition to the quantity needed for compensating for the decline associated with operation of the engine into the circulation passage is zero. Namely, as described in step S413 in FIG. 4, in this case, only the predetermined quantity 1 (Ps) of oxygen gas is supplied as surplus gas into the circulation passage.

In addition, since each processing from step S413 to step S418 is the same as each processing from step S403 to step S408 when it is judged to be in the state where the engine has been already started (step S401: No) and it is judged that the operational status of the engine is in a stationary state (step S402: Yes), they will not be explained anew here. However, in this case, since the engine has not yet been started, processing which corresponds to step S409 (processing to suppress the supply quantity of oxygen gas and reduces surplus oxygen gas by operation of the engine after an airtightness judgment) is not performed.

3) Specific example of detection method of airtight failure in working-gas circulating type gas engine (2)

As mentioned above, in accordance with a detection method of an airtight failure in a working-gas circulating type gas engine according to the present invention, the airtight failure in the working-gas circulating type gas engine can be detected with sufficient accuracy by supplying as surplus gas at least one of fuel gas, oxidizer gas, and working gas in an extra predetermined quantity 1 into a circulation passage, and judging the existence of an airtight failure in the working-gas circulating type gas engine based on the absolute values of the difference (quantity deviation of circulation gas) between the quantity of the surplus gas which must have been thus supplied into the circulation passage (predetermined quantity 1) and the increment of the quantity of the gas in the circulation passage separately detected by a gas quantity detecting means (circulating gas increase). Moreover, based on the judgment result thus obtained, various actions (for example, emitting warning, etc.) can be also controlled.

Here, such a series of processing will be explained referring to FIG. 6. As mentioned above, FIG. 6 is a flow chart showing a series of processing performed in a detection method of an airtight failure in a working-gas circulating type gas engine according to another embodiment of the present invention. The series of processing shown in the flow chart can be also performed by ECU (not shown) as interruption processing, for example, for every predetermined crank angle.

Figure 6:
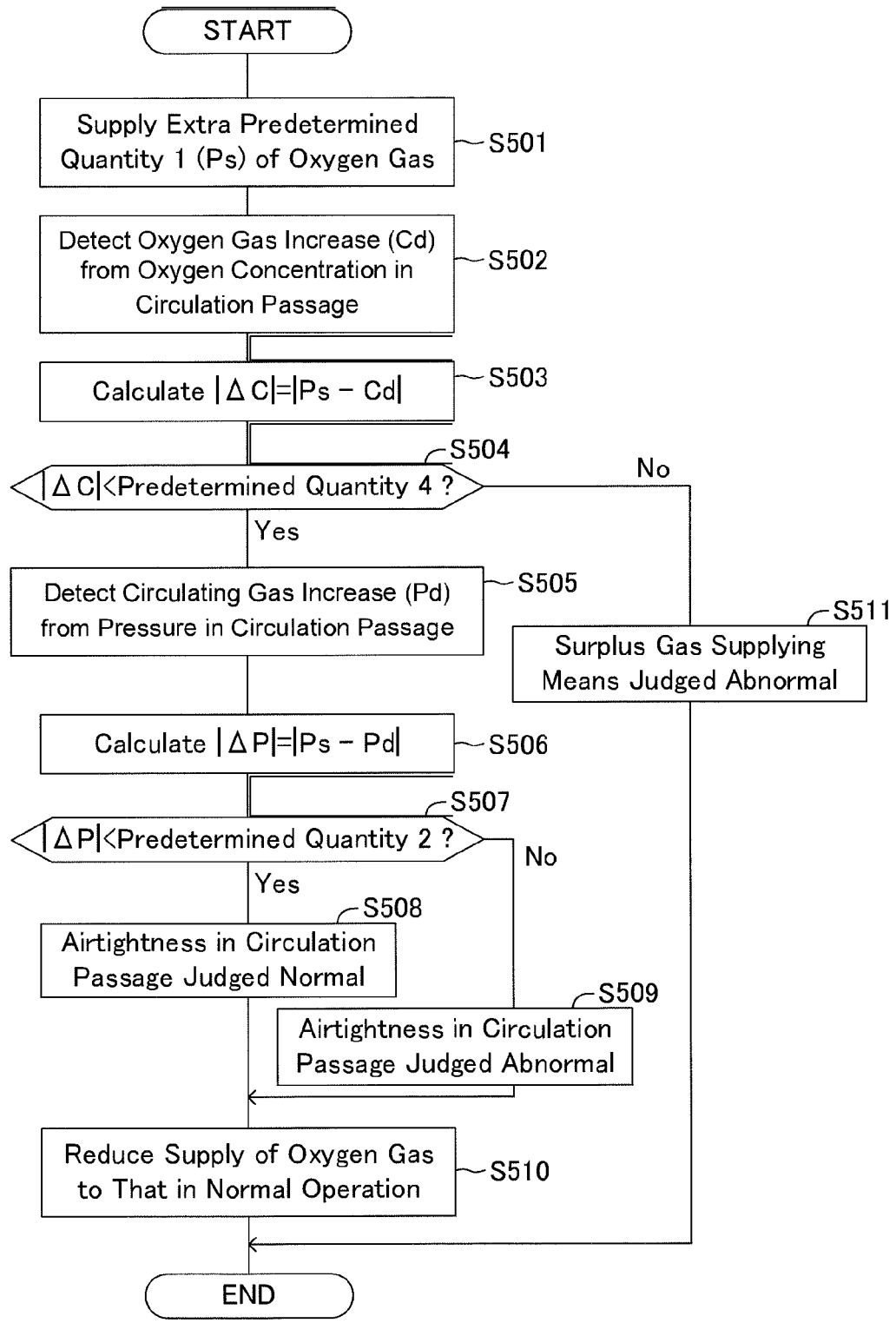
FIG. 6 A flow chart showing a series of processing performed in a detection method of an airtight failure in a working-gas circulating type gas engine according to another embodiment of the present invention.

As shown in FIG. 6, in the present embodiment, processing corresponding to step S401 (judgment on whether it is in the state, where the ignition switch is set to ON in the working-gas circulating type gas engine and the engine has not yet been started, or not) and step S402 (judgment on whether the operational status of the engine is in a stationary state or not) in the embodiment shown in FIG. 4 is omitted.

In the present embodiment, first, as a surplus gas supplying step, an extra predetermined quantity 1 (Ps) of oxygen gas, which is oxidizer gas, in addition to the quantity needed for compensating for the decline associated with operation of the engine is supplied as surplus gas into the circulation passage (step S501). Here, the predetermined quantity 1 (Ps) can be set, taking into consideration the accuracy of supply quantity control of the supplying means of the oxygen gas supplied as surplus gas, the detection accuracy of the gas quantity detecting means, etc., as mentioned above.

Next, as a surplus gas increase detecting step, based on the change of the surplus gas concentration (oxygen concentration) before and after the surplus gas supplying step (step S501) detected by a surplus gas concentration detecting means (in the present embodiment, an oxygen concentration detecting means), a surplus gas increase (in the present embodiment, an oxygen gas increase) (Cd) which is the increment of the quantity of the surplus gas (oxygen gas) in the circulation passage before and after the surplus gas supplying step (step S501) is detected (step S502).

Furthermore, the absolute value (|ΔC|) of the quantity deviation of surplus gas (in the present embodiment, the quantity deviation of oxygen gas) (ΔC) which is the difference of the predetermined quantity 1 (Ps) and the surplus gas increase (Cd) is calculated in step S503, and it is judged whether the absolute value (|ΔC|) of the quantity deviation of surplus gas ΔC is less than a predetermined quantity 4 or not in step S504.

Here, the above-mentioned predetermined quantity 4 is a threshold value for judging the existence of an airtight failure in the supplying means of surplus gas based on the absolute value (|ΔC|) of quantity deviation of surplus gas ΔC as mentioned above. In other words, it can be said that the above-mentioned predetermined quantity 4 is the maximum acceptable value of a difference between the quantity Ps (predetermined quantity 1) of oxygen gas which must have been increased by an oxygen gas supplying means in a surplus gas supplying step (step S501) and the surplus gas increase Cd detected by a surplus gas concentration detecting means in a surplus gas increase detecting step (step S502). In addition, the predetermined quantity 4 can be suitably set, taking into consideration, for example, the accuracy of supply quantity control of the supplying means of the gas supplied as surplus gas, the detection accuracy of a surplus gas concentration detecting means, etc.

In the above-mentioned step S504, when the absolute value ($|\Delta C|$) of quantity deviation of surplus gas ($\Delta C$) is judged to be less than the predetermined quantity 4 (step S504: Yes), it is judged that there is no airtight failure in the surplus gas supplying means, namely, it is judged that the supplying means of surplus gas supplies a precise quantity of surplus gas. On the other hand, when the absolute values ($|\Delta C|$) of quantity deviation of surplus gas ($\Delta C$) is judged to be the predetermined quantity 4 or more in the above-mentioned step S504 (step S504: No), it is judged that there is an airtight failure in the supplying means of surplus gas, namely, it is judged that the supplying means of surplus gas does not supply a precise quantity of surplus gas (step S511). Namely, step S502 to step S504 and step S511 correspond to the above-mentioned supplying means failure judging step.

As mentioned above, in step S504, when the absolute value ($|\Delta C|$) of quantity deviation of surplus gas ($\Delta C$) is judged to be the predetermined quantity 4 or more (step S504: No), it is judged that there is an airtight failure in the surplus gas supplying means (step S511). On the other hand, as mentioned above, a detection method of an airtight failure in a working-gas circulating type gas engine according to the present invention is based on the premise that a means for supplying surplus gas supplies a precise quantity of surplus gas into a circulation passage. Therefore, in the situation where a failure of some kind arises in the means for supplying surplus gas and therefore a precise quantity of surplus gas cannot be supplied into a circulation passage, it becomes difficult to attain the purpose of the present invention of detecting an airtight failure in a working-gas circulating type gas engine with sufficient accuracy.

Therefore, in the present embodiment, as shown in FIG. 6, when it is judged that a surplus gas supplying means has a failure (step S504: No, then step S511), the series of processing to be performed in accordance with the flow chart shown in FIG. 6 is ended. Thus, in accordance with the present embodiment, since the normal operation of the supplying means of surplus gas which is the prerequisite for judging the existence of an airtight failure in a working-gas circulating type gas engine can be checked, the reliability of a detection method of an airtight failure in a working-gas circulating type gas engine according to the present invention can be further improved.

Here, the relation between the supplied quantity of surplus gas (quantity which the supplying means must have supplied) and the actually detected quantity (quantity derived from the surplus gas concentration in the circulation passage detected by a surplus gas concentration detecting means) when surplus gas (in the present embodiment, oxygen gas) is excessively supplied into the circulation passage as mentioned above will be explained referring to FIG. 7. As mentioned above, FIG. 7 is a graph showing the relation between the supplied quantity and detected quantity of surplus gas when surplus gas is supplied into a circulation passage.

Figure 7:
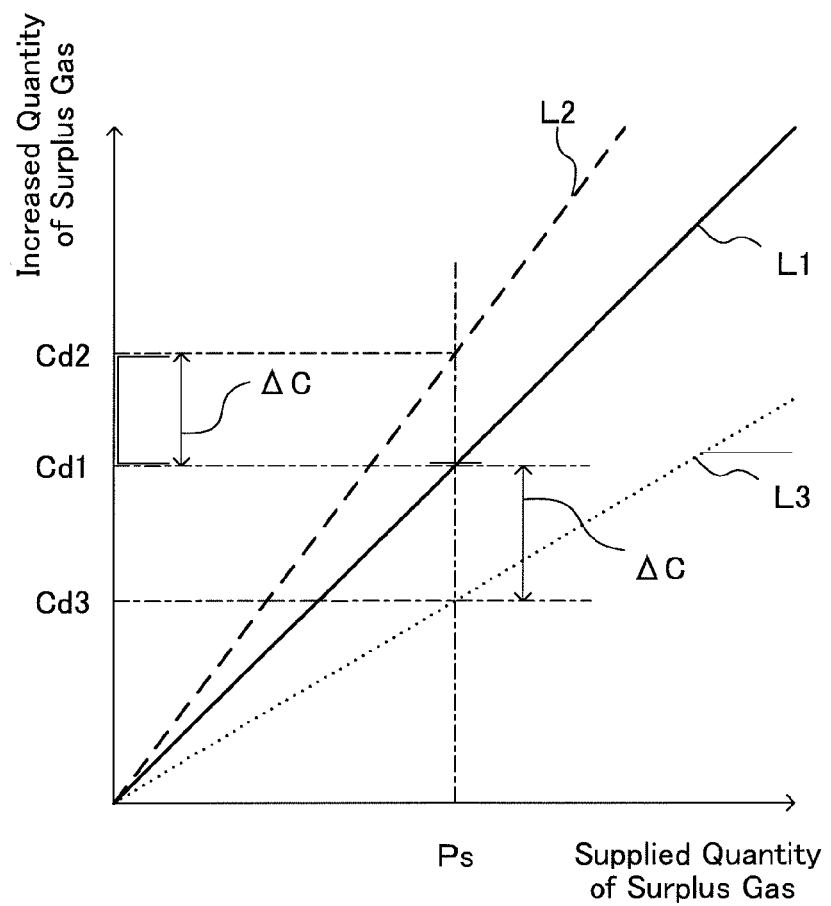
FIG. 7 A graph showing the relation between the supplied quantity and detected quantity of surplus gas when surplus gas is supplied into a circulation passage.

The horizontal axis of the graph shown in FIG. 7 expresses the supplied quantity of surplus gas (in the present embodiment, oxygen gas) calculated based on the direction signal (control signal) sent out to a surplus gas supplying means (in the present embodiment, oxygen gas supplying means) so that an extra predetermined quantity of surplus gas is into a circulation passage. Namely, the horizontal axis expresses the quantity of surplus gas which a surplus gas supplying means should excessively supply into a circulation passage. On the other hand, the vertical axis expresses the quantity of the surplus gas derived from the actually detected concentration in the circulation passage of surplus gas (in the present embodiment, oxygen gas) excessively supplied into the circulation passage. Namely, the vertical axis expresses the quantity of the surplus gas which a surplus gas supplying means actually supplied into the circulation passage. Moreover, the line L1 (solid line) in the graph shows the relation between the supplied quantity and detected quantity of surplus gas when a supplying means of surplus gas (in the present embodiment, oxygen gas supplying means) is normal, and the line L2 (dashed line) and line L3 (dotted line) shows the relation between the supplied quantity and detected quantity of surplus gas when the actual quantity (that is, actually detected quantity) of surplus gas supplied by a supplying means of surplus gas is too much and too little, respectively.

First, referring to the line L1 (solid line), the relation between the supplied quantity and detected quantity of surplus gas in a circulation passage when a surplus gas supplying means (in the present embodiment, an oxygen gas supplying means) is normal. In this case, since a surplus gas supplying means supplies the right quantity of surplus gas (in the present embodiment, oxygen gas), for example, based on a directions signal (control signal) sent out from ECU, the supply quantity and detected quantity of surplus gas bear one-on-one relationship to each other.

However, the line L2 (dashed line) and line L3 (dotted line) show the relation between the supplied quantity and detected quantity of surplus gas when a supplying means of surplus gas is abnormal, more particularly, when the actual quantity of surplus gas supplied by a supplying means of surplus gas is too much and too little, respectively. As shown in FIG. 7, the plots (line L2) appear above the line L1 when the quantity actually supplied by a surplus gas supplying means is too much, while the plots (line L3) appear below the line L1 when the quantity actually supplied by a surplus gas supplying means is too little.

In the present embodiment, an extra predetermined quantity 1 (Ps) of surplus gas in addition to the quantity needed for compensating for the decline associated with operation of the engine is supplied into the circulation passage. The detected quantity of surplus gas (surplus gas increase Cd) derived from the concentration of surplus gas actually detected after supplying thereof corresponds to the predetermined quantity 1 (Ps) (or the difference between them is small). However, when a surplus gas supplying means has a failure, there is a possibility that the quantity of surplus gas actually supplied by a surplus gas supplying means may be too much or too little. In FIG. 7, the surplus gas increase on the line L1 (solid line) corresponding to the case where a supplying means of surplus gas is normal is indicated as Cd1, and the surplus gas increase on the line L1 (solid line) and the line L3 (dotted line) corresponding to the cases where the quantities actually supplied by a supplying means of surplus gas (that is, the quantity actually detected) are too much and too little respectively are indicated as Cd2 and Cd3 respectively. Based on whether the absolute value ($|\Delta C|$) of the quantity deviation of surplus gas ($\Delta C = Ps - Cd$) which is the difference between the predetermined quantity 1 (Ps), which is the quantity that must have been supplied, and the quantity actually detected (Cd) is less than the predetermined quantity 4 as the above-mentioned threshold value or not, it can be accurately judged whether a surplus gas supplying means has a failure or not.

Thus, in accordance with the present embodiment, the normal operation of a supplying means of surplus gas, which is the prerequisite for a detection method of an airtight failure in a working-gas circulating type gas engine according to the present invention, can be checked preliminarily. In a situation where it appears that a failure of some kind arises in a means for supplying surplus gas and therefore the means for supplying surplus gas cannot supply a precise quantity of surplus gas into a circulation passage, since it becomes difficult to attain the purpose of the present invention of detecting an airtight failure in a working-gas circulating type gas engine with sufficient accuracy, the judgment of the airtightness of the engine can be stopped. On the other hand, in a situation where it appears that a means for supplying surplus gas is being operated normally, the judgment of the airtightness of the engine can be performed with high accuracy, and the reliability of a detection method of an airtight failure in a working-gas circulating type gas engine according to the present invention can be improved.

Namely, when the absolute value ($|\Delta C|$) of the quantity deviation of surplus gas ($\Delta C$) is judged to be less than the predetermined quantity 4 in step S504 (step S504: Yes), since it is judged that there is no failure in the surplus gas supplying means, there is no concern as mentioned above. Therefore, in this case, similarly to the embodiment shown in FIG. 4, the circulating gas increase (Pd) which is the increment of the quantity of the gas in the circulation passage before and after the above-mentioned surplus gas supplying step is detected by a gas quantity detecting means (in the present embodiment, a gas pressure detecting means) in a circulating gas increase detecting step (step S505).

Furthermore, the absolute value ($|\Delta P|$) of the quantity deviation of circulating gas ($\Delta P$) which is the difference between the predetermined quantity 1 (Ps) and the circulating gas increase (Pd) is calculated in step S506, and it is judge whether the absolute value ($|\Delta P|$) of the quantity deviation of circulating gas ($\Delta P$) is less than the predetermined quantity 2 or not in step S507. Here, the predetermined quantity 2 can be suitably set, taking into consideration, for example, the accuracy of supply quantity control of the supplying means of the gas supplied as surplus gas, the detection accuracy of a surplus gas quantity detecting means, etc.

When the absolute value ($|\Delta P|$) of the quantity deviation of circulating gas ($\Delta P$) is judged to be less than the predetermined quantity 2 in the above-mentioned step S507 (step S507:Yes), it is judged that there is no airtight failure in the engine, namely, it is judged that the airtightness in the circulation passage of the engine is normal (step S508). On the other hand, when the absolute value ($|\Delta P|$) of the quantity deviation of circulating gas ($\Delta P$) is judged to be the predetermined quantity 2 or more in the above-mentioned step S507 (step S507: No), it is judged that there is an airtight failure in the engine, namely, it is judged that the airtightness in the circulation passage of the engine in abnormal (step S509). Namely, step S506 to step S509 correspond to the above-mentioned airtightness judging step.

Then, in the present embodiment, similarly to the above-mentioned fourth embodiment of the present invention, a surplus gas decreasing step in which oxygen gas which was excessively supplied as surplus gas into the circulation passage in the surplus gas supplying step (in the present embodiment, step S501) in a quantity which is a predetermined quantity 3 less than the quantity needed for compensating for the decline associated with operation of the engine is supplied into the circulation passage and thereby the quantity of oxygen gas in the circulation passage is decreased to that during normal operation before the surplus gas supplying step is performed (step S510).

As mentioned above, as explained in detail referring to FIG. 6 and FIG. 7, in accordance with the present embodiment, an extra predetermined quantity 1 (Ps) of oxygen gas in addition to the quantity needed for compensating for the decline associated with operation of the engine is supplied as surplus gas into the circulation passage and, first of all, the actual increase of surplus gas (Cd) corresponding thereto is detected based on the oxygen gas concentration detected in the circulation passage by an oxygen gas concentration detecting means, and the existence of a failure in a surplus gas (oxygen gas) supplying means can be judged based on whether the absolute value ($|\Delta C|$) of the quantity deviation of surplus gas ($\Delta C$) which is the difference between the predetermined quantity 1 (Ps) and the surplus gas increase (Cd) is less than a predetermined quantity 4 or not.

Then, when a failure is observed in a surplus gas (oxygen gas) supplying means, the judgment of an airtight failure in the circulation passage of the engine is stopped. On the other hand, when no failure is observed, the circulating gas increase (Pd) which is the increment of the quantity of the gas in the circulation passage corresponding to the extra predetermined quantity 1 (Ps) of surplus gas (oxygen gas) having been supplied into the circulation passage is detected by a gas pressure detecting means, and the existence of an airtight failure in the circulation passage of the engine can be judged with high accuracy, based on whether the absolute value ($|\Delta P|$) of the quantity deviation of circulating gas ($\Delta P$) which is the difference between the predetermined quantity 1 (Ps) and the circulating gas increase (Pd) is less than a predetermined quantity 2 or not.

Furthermore, in the present embodiment, after the above-mentioned judgment, oxygen gas, which was excessively supplied as surplus gas into the circulation passage, in a quantity which is a predetermined quantity 3 less than the quantity needed for compensating for the decline associated with operation of the engine is supplied into the circulation passage and thereby the quantity of oxygen gas in the circulation passage can be returned back to that during normal operation before the surplus gas supplying step without taking any special measure, such as new installation of an apparatus for decreasing surplus gas.

Although some embodiments with specific configurations and combinations of execution procedures have been explained above for the objective of explaining the present invention, the scope of the present invention is not limited to these exemplary embodiments, various modifications can be properly added thereto within the limits of the matter described in the claims and specification.

REFERENCE SIGNS LIST

110: main part of engine, 111: cylinder head, 112: cylinder, 113: piston, 114: crankshaft, 115: connecting rod, 116: oil pan, 117: combustion chamber, 118: crankcase, 121: intake valve, 122: exhaust valve, 123: fuel injection valve, 130: fuel gas supplying means, 131: fuel gas storage tank, 132: fuel gas passage, 140: oxidizer gas supplying means, 141: oxidizer gas storage tank, 142: oxidizer gas passage, 150: working gas supplying means, 151: working gas storage tank, 152: working gas passage, 160: circulation passage, 161: first passage part (first channel-forming pipe), 162: second passage part (second channel-forming pipe), 170: combustion product removing means, 171: coolant inlet port, 172: coolant outlet port, 173: condensed water outlet port, 174: heat radiator (radiator), 180: gas quantity detecting means, 181: gas quantity sensor, 182: gas quantity detection signal sending-out line, 190: surplus gas concentration detecting means, 191: surplus gas concentration sensor, and 192: surplus gas concentration detection signal sending-out line.

The invention claimed is:

1. A detection method of an airtight failure in a working-gas circulating type gas engine,
said working-gas circulating type gas engine leads fuel gas, oxidizer gas, and working gas to a combustion chamber and burns said fuel gas in the combustion chamber to obtain motive power, and
said working-gas circulating type gas engine comprises:
a fuel gas supplying device that comprises a fuel injection valve and supplies said fuel gas using said fuel injection valve,
an oxidizer gas supplying device that comprises an oxidizer gas supplying valve and supplies said oxidizer gas using said oxidizer gas supplying valve,
a working-gas supplying device that comprises a working gas supplying valve and supplies said working gas, using said working gas supplying valve,
a sealed circulation passage which circulates burnt gas emitted from an exhaust port which communicate to said combustion chamber to an intake port which communicates to said combustion chamber circulate therethrough, and
a combustion product removing device that comprises at least one of a condensation machine and an adsorption material and separates and removes combustion product produced by combustion of said fuel gas from said burnt gas using said at least one of said condensation machine and said adsorption material, characterized in that;
said working-gas circulating type gas engine further comprises:
a sensor that detects gas quantity in said circulation passage, and
an airtightness judging device that is constituted by an ECU comprising a CPU and a memory storage, and judges the airtightness of said circulation passage by said CPU performing a processing specified by a program corresponding to said detection method, and
said detection method includes:
a surplus gas supplying step in which at least one of said fuel gas, said oxidizer gas, and said working gas in an extra predetermined quantity 1 in addition to the quantity needed for compensating for a decline of the quantity of said at least one of said gases associated with operation of the engine is supplied as surplus gas into said circulation passage,
a circulating gas increase detecting step in which a circulating gas increase which is an increment of the quantity of gas in said circulation passage before and after said surplus gas supplying step is detected by said sensor, and
an airtightness judging step in which it is judged that there is an airtight failure in said working-gas circulating type gas engine when the absolute value of a quantity deviation of circulation gas which is the difference between said predetermined quantity 1 and said circulating gas increase is a predetermined quantity 2 or more, while it is judged that there is no airtight failure in said working-gas circulating type gas engine when the absolute values of said quantity deviation of circulation gas is less than said predetermined quantity 2.

2. A detection method of an airtight failure in a working-gas circulating type gas engine according to claim 1, characterized in that;
said fuel gas, oxidizer gas, and working gas are hydrogen, oxygen, and argon, respectively.

3. A detection method of an airtight failure in a working-gas circulating type gas engine according to claim 1, characterized in that;
said sensor comprises a pressure sensor and detects the pressure of the gas in said circulation passage using said pressure sensor.

4. A detection method of an airtight failure in a working-gas circulating type gas engine according to claim 1, characterized in that;
said surplus gas is in any of said fuel gas or said oxidizer gas, and
after said circulating gas increase detecting step, said detection method of an airtight failure in a working-gas circulating type gas engine further includes:
a surplus gas decreasing step in which the gas, which was excessively supplied as said surplus gas in said surplus gas supplying step, in a quantity which is a predetermined quantity 3 less than the quantity needed for compensating for the decline of the quantity of said surplus gas associated with operation of the engine is supplied into said circulation passage, and thereby the quantity of the gas in said circulation passage is returned back to that before said surplus gas supplying step.

5. A detection method of an airtight failure in a working-gas circulating type gas engine according to claim 1, characterized in that;
said working-gas circulating type gas engine further comprises:
a surplus gas concentration detecting device that detects the surplus gas concentration which is the concentration of said surplus gas, and
a supplying device failure judging device that judges the existence of a failure in said supplying device of surplus gas, and
said detection method of an airtight failure in said working-gas circulating type gas engine further includes:
a surplus gas increase detecting step in which a surplus gas increase which is the increment of the quantity of the surplus gas in said circulation passage before and after said surplus gas supplying step is detected based on change of the surplus gas concentration before and after said surplus gas supplying step detected by said surplus gas concentration detecting device, and
a supplying device failure judging step in which it is judged that there is a failure in said supplying device of surplus gas when the absolute value of a quantity deviation of surplus gas which is the difference between said predetermined quantity 1 and said surplus gas increase is a predetermined quantity 4 or more, while it is judged that there is no failure in said supplying device of surplus gas when the absolute value of said quantity deviation of surplus gas is less than said predetermined quantity 4.

6. A working-gas circulating type gas engine, which leads fuel gas, oxidizer gas, and working gas to a combustion chamber and burns said fuel gas in the combustion chamber to obtain motive power and comprises:
- a fuel gas supplying device that comprises a fuel injection valve and supplies said fuel gas using said fuel injection valve,
- an oxidizer gas supplying device that comprises an oxidizer gas supplying valve and supplies said oxidizer gas using said oxidizer gas supplying valve,
- a working-gas supplying device that comprises a working gas supplying valve and supplies said working gas using said oxidizer gas supplying valve,
- a sealed circulation passage which circulates burnt gas emitted from an exhaust port which communicate to said combustion chamber to an intake port which communicates to said combustion chamber circulate therethrough, and
- a combustion product removing device that comprises at least one of a condensation machine and an adsorption material and separates and removes combustion product produced by combustion of said fuel gas from said burnt gas using said at least one of said condensation machine and said adsorption material, characterized in that;
- said working-gas circulating type gas engine further comprises:
- a sensor that detects gas quantity in said circulation passage, and
- an airtightness judging device that is constituted by an ECU comprising a CPU and a memory storage, and judges the airtightness of said circulation passage, and
- in said working-gas circulating type gas engine:
- at least one of said fuel gas supplying device, said oxidizer gas supplying device, and said working-gas supplying device supplies at least one of said fuel gas, said oxidizer gas, and said working gas in an extra predetermined quantity 1 in addition to the quantity needed for compensating for a decline of the quantity of said at least one of said gases associated with operation of the engine as surplus gas into said circulation passage,
- said sensor detects a circulating gas increase which is an increment of the quantity of gas in said circulation passage before and after said surplus gas supplying step, and
- said airtightness judging device judges that there is an airtight failure in said working-gas circulating type gas engine when the absolute value of a quantity deviation of circulation gas which is the difference between said predetermined quantity 1 and said circulating gas increase is a predetermined quantity 2 or more, while it judges that there is no airtight failure in said working-gas circulating type gas engine when the absolute values of said quantity deviation of circulation gas is less than said predetermined quantity 2 by said CPU performing a processing specified by a corresponding program.

7. A working-gas circulating type gas engine according to claim 6, characterized in that;
said fuel gas, oxidizer gas, and working gas are hydrogen, oxygen, and argon, respectively.

8. A working-gas circulating type gas engine according to claim 6, characterized in that;
said sensor comprises a pressure sensor and detects the pressure of the gas in said circulation passage using said pressure sensor.

9. A working-gas circulating type gas engine according to claim 6, characterized in that;
said surplus gas is in any of said fuel gas or said oxidizer gas, and
in said working-gas circulating type gas engine,
after said sensor device detects said circulating gas increase,
said supplying device of surplus gas supplies the gas, which was excessively supplied as said surplus gas by said supplying device of surplus gas, in a quantity which is a predetermined quantity 3 less than the quantity needed for compensating for the decline of the quantity of said surplus gas associated with operation of the engine into said circulation passage, and thereby returns the quantity of the gas in said circulation passage back to that before said surplus gas was excessively supplied.

10. A working-gas circulating type gas engine according to claim 6, characterized in that;
said working-gas circulating type gas engine further comprises:
- a surplus gas concentration detecting device that detects the surplus gas concentration which is the concentration of said surplus gas, and
- a supplying device failure judging device that judges the existence of a failure in said supplying device of surplus gas, and
in said working-gas circulating type gas engine,
- a surplus gas increase which is the increment of the quantity of the surplus gas in said circulation passage before and after said surplus gas was excessively supplied is detected based on change of the surplus gas concentration before and after said surplus gas was excessively supplied detected by said surplus gas concentration detecting device, and
- a supplying device failure judging device judges that there is a failure in said supplying device of surplus gas when the absolute value of a quantity deviation of surplus gas which is the difference between said predetermined quantity 1 and said surplus gas increase is a predetermined quantity 4 or more, while it judges that there is no failure in said supplying device of surplus gas when the absolute value of said quantity deviation of surplus gas is less than said predetermined quantity 4.

* * * * *